United States Patent
Kim et al.

(10) Patent No.: US 12,352,865 B2
(45) Date of Patent: Jul. 8, 2025

(54) APPARATUS AND METHOD FOR TRACKING AN OBJECT USING A LIDAR SENSOR AND A RECORDING MEDIUM STORING A PROGRAM TO EXECUTE THE METHOD

(71) Applicants: HYUNDAI MOTOR COMPANY, Seoul (KR); KIA CORPORATION, Seoul (KR)

(72) Inventors: Nam Gyun Kim, Seongnam-si (KR); Mu Gwan Jeong, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 391 days.

(21) Appl. No.: 17/844,507

(22) Filed: Jun. 20, 2022

(65) Prior Publication Data
US 2022/0404504 A1    Dec. 22, 2022

(30) Foreign Application Priority Data
Jun. 21, 2021  (KR) .................... 10-2021-0080177

(51) Int. Cl.
*G01S 17/89*    (2020.01)
*G01S 17/66*    (2006.01)

(52) U.S. Cl.
CPC .............. *G01S 17/89* (2013.01); *G01S 17/66* (2013.01)

(58) Field of Classification Search
CPC .......... G01S 17/89; G01S 17/66; G01S 17/42; G01S 7/4808; G01S 7/4802; G01S 17/894
See application file for complete search history.

(56) References Cited

U.S. PATENT DOCUMENTS

| | | | |
|---|---|---|---|
| 2014/0368807 A1* | 12/2014 | Rogan ..................... | G01S 17/89 356/28 |
| 2019/0317507 A1* | 10/2019 | Zhang ................... | G05D 1/0278 |
| 2020/0256999 A1* | 8/2020 | Yellepeddi ............. | G01S 17/89 |
| 2020/0377105 A1* | 12/2020 | Murashkin ............ | B60W 40/04 |
| 2021/0201578 A1* | 7/2021 | Chaudhuri .............. | G06T 7/246 |

* cited by examiner

*Primary Examiner* — Manuel A Rivera Vargas
(74) *Attorney, Agent, or Firm* — Lempia Summerfield Katz LLC

(57) ABSTRACT

A method of tracking an object using a LiDAR sensor includes: acquiring a point cloud using each of LiDAR sensors and clustering the point cloud. The clustering includes generating a three-dimensional (3D) grid map using the point cloud acquired by each of the LiDAR sensors; labeling voxels present in the 3D grid map with one cluster using direction points of the voxels; and checking whether it is necessary to label the voxels with mutually different clusters.

20 Claims, 33 Drawing Sheets

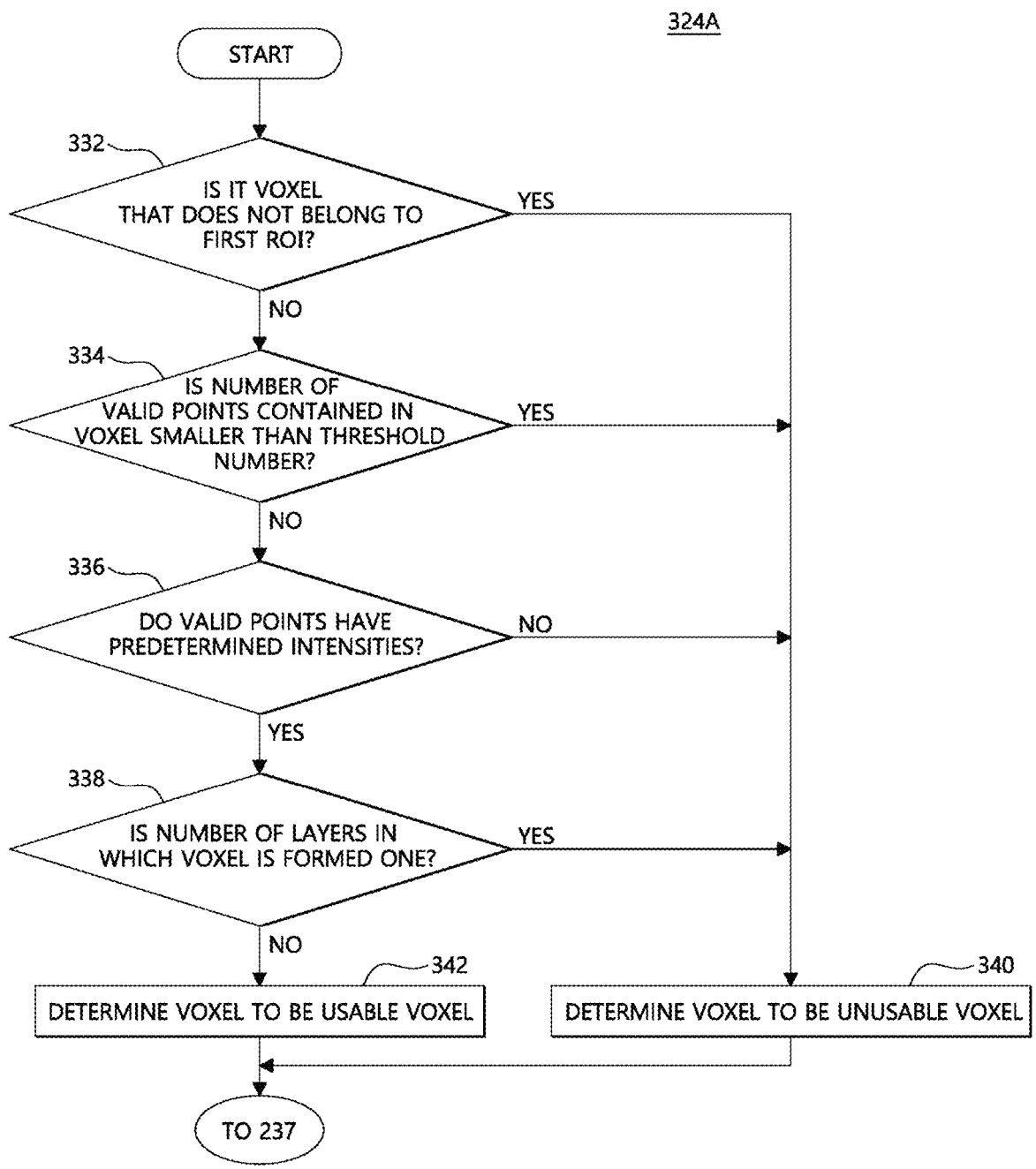

FIG. 14

FIG. 21A
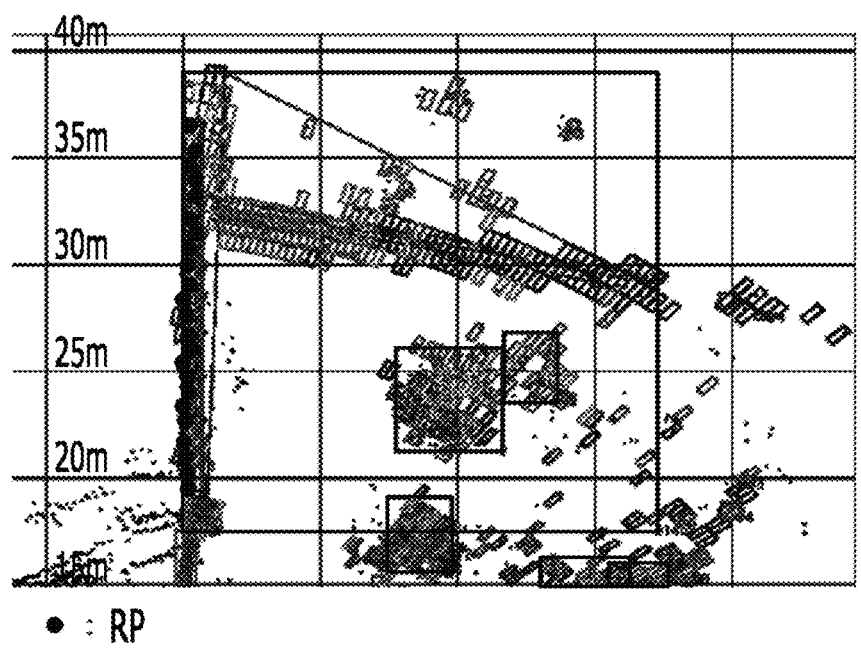
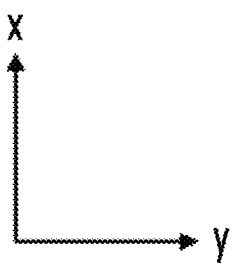

• DSP

TV1

530

532

534

APPARATUS AND METHOD FOR TRACKING AN OBJECT USING A LIDAR SENSOR AND A RECORDING MEDIUM STORING A PROGRAM TO EXECUTE THE METHOD

CROSS REFERENCE TO RELATED APPLICATION

This application claims the benefit of priority to Korean Patent Application No. 10-2021-0080177, filed on Jun. 21, 2021, the entire contents of which are hereby incorporated by reference as if fully set forth herein.

BACKGROUND

Field

The present disclosure relates to an apparatus and a method for tracking an object using a LiDAR sensor and to a recording medium storing a program to execute the method.

Discussion of the Related Art

Various technologies are being developed for autonomous driving of vehicles. For example, information on a target vehicle may be obtained using a light detection and ranging (LiDAR) sensor, and an autonomous driving function of a vehicle may be supported using the obtained information. However, the accuracy of a cluster, which is obtained as a result of clustering a point cloud obtained using a LiDAR sensor, is low. Therefore, research with the goal of solving this problem is underway.

SUMMARY

Accordingly, the present disclosure is directed to an apparatus and a method for tracking an object using a LiDAR sensor and to a recording medium storing a program to execute the method. The apparatus, the method, and the recording medium substantially obviate one or more problems due to limitations and disadvantages of the related art.

The present disclosure provides an apparatus and a method for tracking an object using a LiDAR sensor that exhibit excellent clustering performance and a recording medium storing a program to execute the method.

However, the objects to be accomplished by the present disclosure are not limited to the above-mentioned objects, and other objects not mentioned herein should be clearly understood by those having ordinary skill in the art from the following description.

A method of tracking an object using a LiDAR sensor according to an embodiment may include acquiring a point cloud using each of LiDAR sensors and clustering the point cloud. The clustering includes (a) generating a three-dimensional (3D) grid map using the point cloud acquired by each of the LiDAR sensors and (b) labeling voxels present in the 3D grid map with one cluster using direction points of the voxels and checking whether it is necessary to label the voxels with mutually different clusters.

For example, the method may further include performing main start initialization to initialize parameters to be used to perform the method of tracking an object according to an operating mode.

For example, the performing main start initialization may include: updating tuning parameters according to the operating mode; updating a constant table according to a tuning value; and obtaining reference points of the voxels according to the tuning value.

For example, the clustering may further include preprocessing the acquired point cloud.

For example, the preprocessing may include performing tuning start initialization to initialize parameters to be used when clustering the point cloud in scan units and performing step initialization to initialize a result of performing the clustering in step units.

For example, the performing step initialization may include selectively removing results of computation performed in a previous step in relation to the voxels of the 3D grid map and selectively removing results of computation performed in the previous step in relation to clusters.

For example, step (a) may include checking whether respective points included in the point cloud are valid points required to generate the 3D grid map. Step (a) may also include updating a layer range of the valid points included in a unit voxel. Step (a) may also include updating the number of valid points included in the unit voxel, the number of interpolation points, and identification numbers. Step (a) may also include obtaining the direction points from among the valid points using the reference points. Step (a) may also include excluding an unusable voxel that is not to be utilized for clustering from among voxels obtained as a result of checking all of the points of the point cloud.

For example, among the points included in the point cloud, points that are object points or interpolation points and have coordinates within a threshold of a first region of interest (ROI) may be determined to be the valid points.

For example, among the valid points, points closest to the reference points, corresponding to vertices of the unit voxel, may be obtained as the direction points.

For example, the excluding an unusable voxel may include checking whether a voxel does not belong to a first ROI; checking the number of valid points included in the voxel; checking the intensities of the valid points included in the voxel; checking the number of layers in which the voxel is formed; and determining the unusable voxel and a usable voxel according to at least one of results of the checking.

For example, step (b) may include (b1) checking whether respective voxels included in the 3D grid map are valid voxels; (b2) performing primary labeling to assign the same identification number to voxels that are estimated to be associated with the same object among the valid voxels; and (b3) performing secondary labeling in which mutually different identification numbers are assigned by checking the voxels to which the same identification number has been assigned through the primary labeling.

For example, in step (b1), a voxel having no point of the point cloud, a voxel on which the primary labeling or the secondary labeling has been performed, or a voxel having only interpolation points may be determined to be an invalid voxel.

For example, step (b2) may include (b21) obtaining a corresponding direction point of a corresponding voxel that is subject to labeling and a comparison direction point of a comparison voxel that is compared with the corresponding voxel and located near the corresponding voxel from among the valid voxels. Step (b2) may also include (b22) checking whether the distance difference between the comparison direction point and the corresponding direction point is less than the size of the corresponding voxel. Step (b2) may also include (b23) checking whether at least one of the comparison direction point or the corresponding direction point is present within a second ROI. Step (b2) may also include (b24) checking whether the spacing distance between the comparison direction point and the corresponding direction point is less than or equal to a predetermined threshold distance. Step (b2) may also include (b25) assigning the same identification number to the comparison voxel and the corresponding voxel when all of step (b22), step (b23), and step (b24) are satisfied.

For example, in step (b3), when the voxels to which the same identification number has been assigned through the primary labeling are voxels generated in association with a boundary of a road, the mutually different identification numbers may be assigned to the voxels.

For example, in step (b3), the following data or information may be used in order to determine whether to assign the mutually different identification numbers to the voxels. The data or information may include the minimum value and the maximum value of the x-axis coordinate and the minimum value of the y-axis coordinate of each of the voxels to which the same identification number has been assigned through the primary labeling and signs of the maximum value and the minimum value of the y-axis coordinate of the center point of each of the voxels For example, the clustering may further include (c) generating a set of points included in the clusters and obtaining general information about the clusters.

For example, step (c) may include downsampling valid points included in the clusters; obtaining information about points included in the clusters; and searching for points included in the clusters to obtain the general information about the clusters.

For example, the clustering may further include (d) processing the clusters.

For example, step (c) may further include obtaining clusters to be processed from among the clusters. Step (d) may include at least one of: when a target cluster that is subject to merging, among the clusters to be processed, is included in a reference cluster serving as a reference for merging, incorporating the target cluster into the reference cluster; merging the target cluster and the reference cluster using widths of the reference cluster and the target cluster in a lateral direction and the spacing distance between the reference cluster and the target cluster in a longitudinal direction; or removing a false cluster or a cluster corresponding to noise from among the clusters using at least one of the number of LiDAR sensors acquiring the point cloud, the positions of the LiDAR sensors, or the sizes of the clusters.

An apparatus for tracking an object using a LiDAR sensor according to another embodiment may include a LiDAR sensor configured to acquire a point cloud and a clustering unit configured to cluster the point cloud. The clustering unit includes a grid map generator configured to generate a 3D grid map using the point cloud acquired by the LiDAR sensor. The clustering unit also includes a labeling unit configured to label voxels present in the 3D grid map with one cluster using direction points of the voxels and to check whether it is necessary to label the voxels with mutually different clusters.

According to still another embodiment, a recording medium in which a program for executing a method of tracking an object using a LiDAR sensor is recorded may store a program to implement a function of acquiring a point cloud using a LiDAR sensor and a function of clustering the point cloud. The function of clustering includes a function of generating a 3D grid map using the point cloud acquired by the LiDAR sensor. The function of clustering also includes a function of labeling voxels present in the 3D grid map with one cluster using direction points of the voxels and checking whether it is necessary to label the voxels with mutually different clusters. The recording medium may be read by a computer system.

BRIEF DESCRIPTION OF THE DRAWINGS

The accompanying drawings are included to provide a further understanding of the present disclosure and are incorporated in and constitute a part of this application. The accompanying drawings illustrate embodiment(s) of the present disclosure and, together with the description, serve to explain the principle of the present disclosure. In the drawings:

FIG. 8 is a flowchart showing an embodiment of step 324 shown in FIG. 7;

FIG. 14 is a view showing a comparison voxel that is to be compared with the corresponding voxel shown in FIG. 13;

FIGS. 21A and 21B are views for explaining the secondary labeling;

DETAILED DESCRIPTION

The present disclosure is now described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure can be more thorough and complete and can more fully convey the scope of the disclosure to those having ordinary skill in the art.

It should be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish one subject or element from another subject or element, without necessarily requiring or involving any physical or logical relationship or sequence between the subjects or elements.

When a component, device, element, or the like of the present disclosure is described as having a purpose or performing an operation, function, or the like, the component, device, or element should be considered herein as being "configured to" meet that purpose or to perform that operation or function.

The operations of the method or the algorithm described in connection with the forms disclosed herein may be embodied directly in a hardware (e.g., a processor) or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

Hereinafter, an apparatus and a method for tracking an object using a LiDAR sensor and a recording medium storing a program to execute the method according to embodiments are described with reference to the accompanying drawings. The apparatus 100 and the method for tracking an object using a LiDAR sensor and the recording medium storing a program to execute the method are described using the Cartesian coordinate system (x-axis, y-axis, z-axis) for convenience of description. However, the apparatus 100, the method, and the recording medium may also be described using other coordinate systems. In the Cartesian coordinate system, the x-axis, the y-axis, and the z-axis are perpendicular to each other, but the embodiments are not limited thereto. In other words, according to another embodiment, the x-axis, the y-axis, and the z-axis may intersect each other obliquely.

Figure 1:
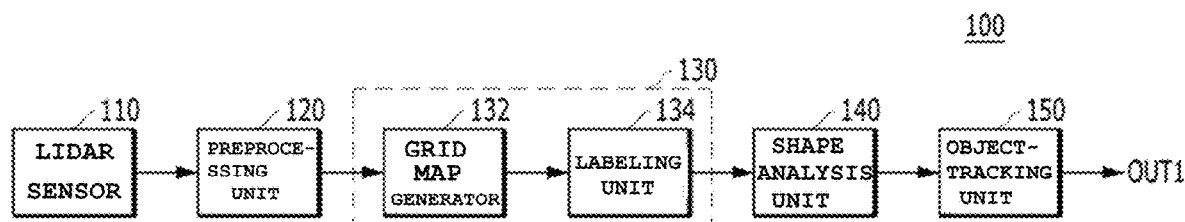
FIG. 1 is a schematic block diagram of an object-tracking apparatus according to an embodiment.
Figure 2:
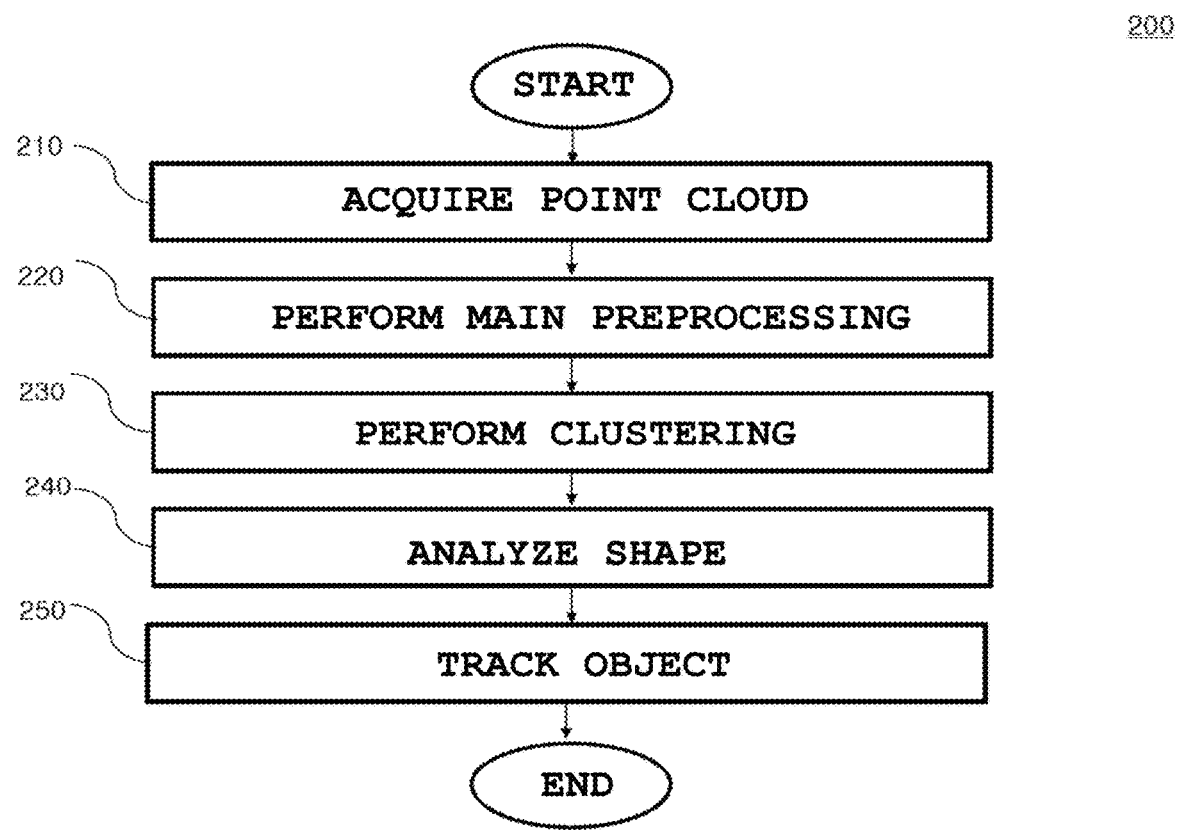
FIG. 2 is a flowchart showing an object-tracking method according to an embodiment.

FIG. 1 is a schematic block diagram of an object-tracking apparatus 100 according to an embodiment, and FIG. 2 is a flowchart showing an object-tracking method 200 according to an embodiment.

The object-tracking apparatus 100 may include a light detection and ranging (LiDAR) sensor 110, a preprocessing unit 120, a clustering unit 130, a shape analysis unit (or a segment unit) 140, and an object-tracking unit (a tracking unit, a tracking and classification unit, or an object-detecting unit) 150.

The LiDAR sensor 110 acquires a point cloud, which is LiDAR data comprising a plurality of points associated with an object (step 210). For example, the LiDAR sensor 110 may radiate a single circular laser pulse having a wavelength of 905 nm to 1550 nm to an object. The LiDAR sensor 110 may also measure the time taken for the laser pulse reflected from an object present within a measurement range to return. Thus, the LiDAR sensor 110 may sense information on the object, for example, the distance from the LiDAR sensor 110 to the object, the orientation of the object, the speed of the object, the temperature of the object, the material distribution of the object, and the concentration characteristics of the object. Here, the object may be, for example, another vehicle, a person, or an obstacle present outside a vehicle equipped with the LiDAR sensor 110 (hereinafter referred to as a "host vehicle"). However, the embodiments are not limited to any specific type of object.

The LiDAR sensor 110 may be provided in a plural number, and the plurality of LiDAR sensors 110 may be disposed at various positions on the host vehicle, such as the roof, the front side portions, and the rear side portions of the host vehicle. However, the embodiments are not limited to any specific positions at which the LiDAR sensors 110 are disposed in the host vehicle or to any specific number of LiDAR sensors 110.

After step 210, the preprocessing unit 120 performs preprocessing on the point cloud (step 220). Hereinafter, the preprocessing in step 220 is referred to as "main preprocessing" in order to distinguish the same from preprocessing in step 233 shown in FIG. 4 and is described below. For example, the preprocessing unit 120 may remove data pertaining to reflections from the body of the host vehicle. In other words, because there is a region that is shielded by the body of the host vehicle depending on the mounting position and the field of view of the LiDAR sensor 110, the preprocessing unit 120 may remove data pertaining to reflections from the body of the host vehicle using a reference coordinate system. In one example, a parsed point group, a result of processing data on the road surface for each point, and filtering information for each point may be output to the clustering unit 130 as the result of preprocessing by the preprocessing unit 120.

In some cases, the preprocessing unit 120 may be omitted from the object-tracking apparatus 100 according to the embodiment.

Figure 3A:
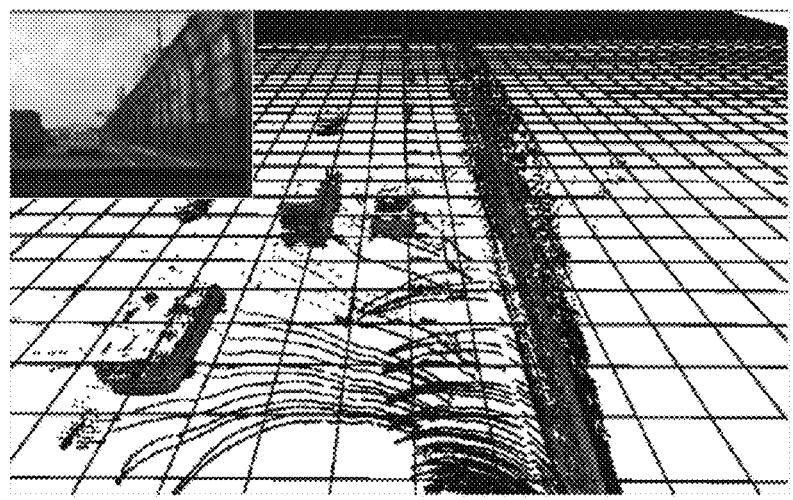
FIGS. 3A and 3B are views to help understand the clustering unit shown in FIG. 1 and step 230 shown in FIG. 2.
Figure 3B:
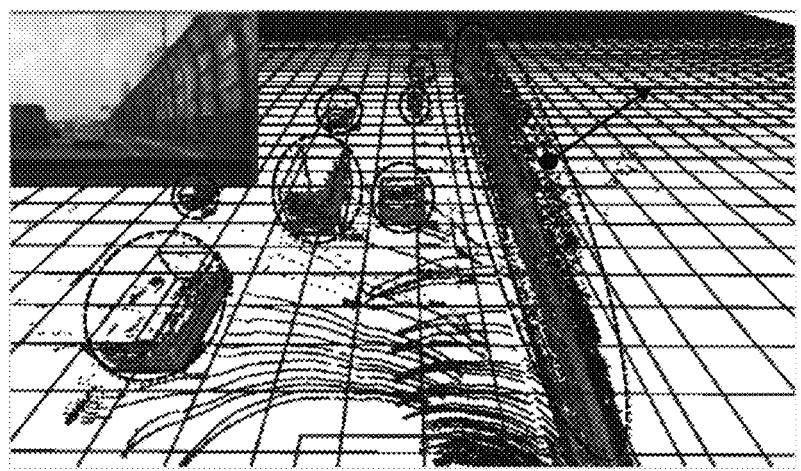

FIGS. 3A and 3B are views to help understand the clustering unit 130 shown in FIG. 1 and step 230 shown in FIG. 2.

After step 220, the clustering unit 130 clusters (or groups) the point cloud shown in FIG. 3A, which is acquired through the LiDAR sensor 110, into meaningful units according to predetermined criteria, as shown in FIG. 3B (step 230). If the preprocessing unit 120 is not omitted, the clustering unit 130 may cluster the LiDAR data preprocessed by the preprocessing unit 120. For example, the clustering unit 130 may cluster the point cloud to generate a contour of the object by applying a grid-based clustering method or a density-based clustering method to the point cloud. The result of sensing by the LiDAR sensor 110 shows a plurality of points, each of which has only information about a position (or coordinates). Therefore, the clustering unit 130 serves to group the plurality of points sensed by the LiDAR sensor 110 into meaningful shape units and to generate a cluster, which is a result of the grouping. For example, the clustering unit 130 may output general information on a set of points in the cluster and on the cluster to the shape analysis unit 140 as the result of the clustering.

After step 230, the shape analysis unit 140 analyzes the shape of the cluster, for example, in a manner of generating information about a plurality of segment boxes for each channel using the result of clustering by the clustering unit 130 (step 240). Here, the segment box may be a result of converting the result of clustering into a geometric box shape. Also, the information about the segment box may be at least one of the width, length, position, or orientation (or heading) of the segment box.

After step 240, the object-tracking unit 150 may track and recognize whether the object, the shape of which has been analyzed, is an obstacle, a vehicle, or a person and the object-tracking unit 150 may output the result of recognition through an output terminal OUT1 (step 250).

Hereinafter, a clustering according to embodiments of the method and the apparatus for tracking an object using a LiDAR sensor are described with reference to the accompanying drawings.

Figure 4:
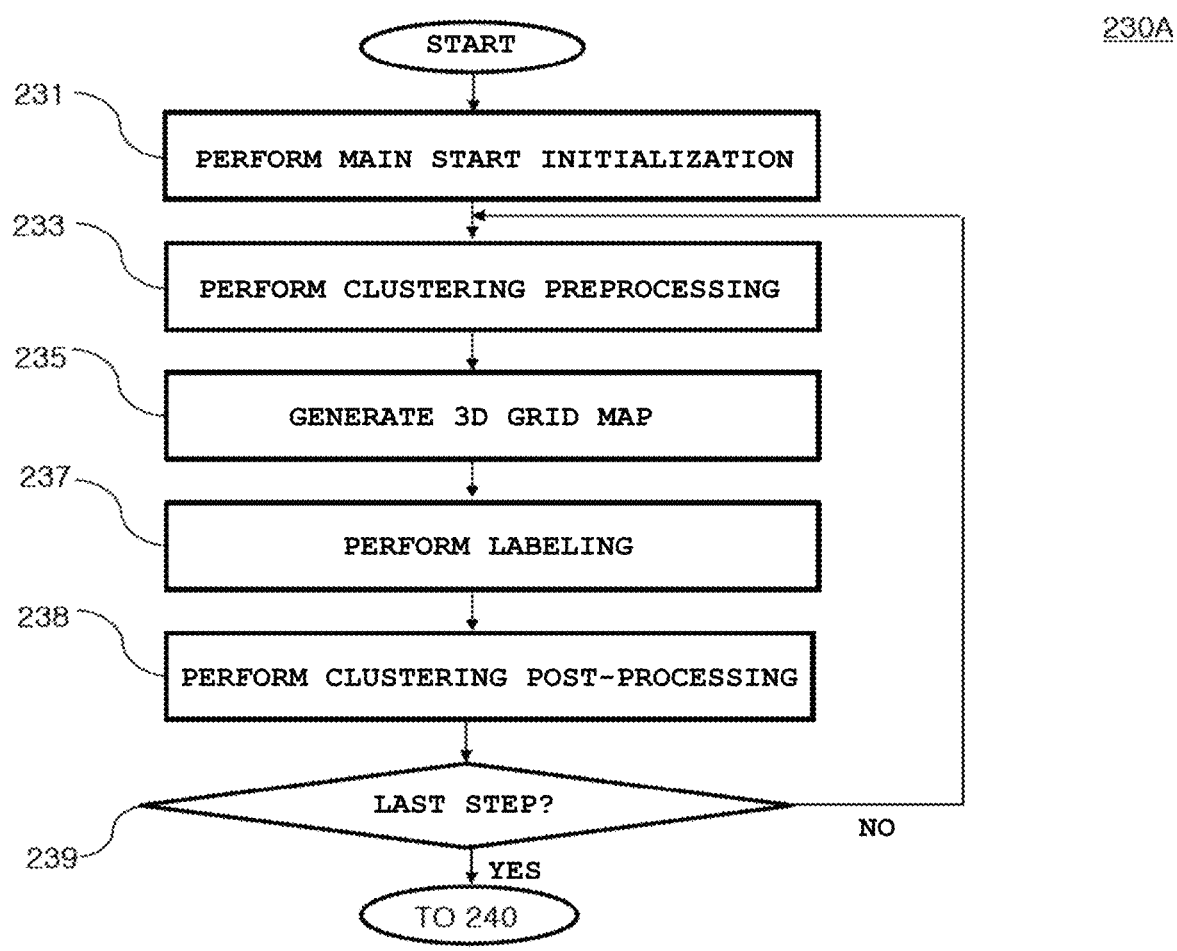
FIG. 4 is a flowchart showing an embodiment of clustering in the object-tracking method.

FIG. 4 is a flowchart showing an embodiment of clustering in the object-tracking method.

For example, the embodiment 230A shown in FIG. 4 may correspond to step 230 shown in FIG. 2 and may be performed by the clustering unit 130 shown in FIG. 1. However, the embodiments are not limited thereto. In other words, the clustering 230A shown in FIG. 4 may be performed by the clustering unit 130 shown in FIG. 1 or may be performed by a clustering unit configured differently from the clustering unit 130 shown in FIG. 1.

First, the parameters to be used to perform the object-tracking method 200 or step 230A shown in FIG. 4 are initialized according to the operating mode (step 231). Hereinafter, the initialization performed in step 231 is referred to as "main start initialization".

Figure 5:
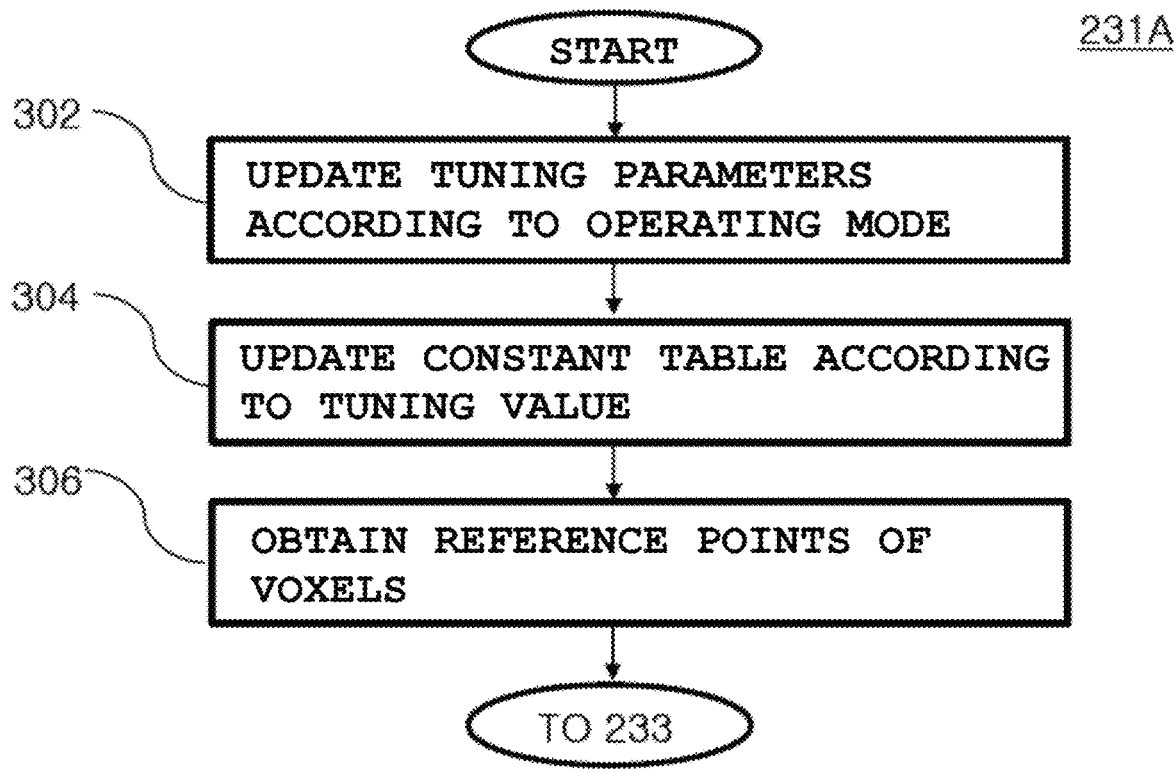
FIG. 5 is a flowchart showing an embodiment of step 231 shown in FIG. 4.

FIG. 5 is a flowchart showing an embodiment 231A of step 231 shown in FIG. 4.

Figure 6A:
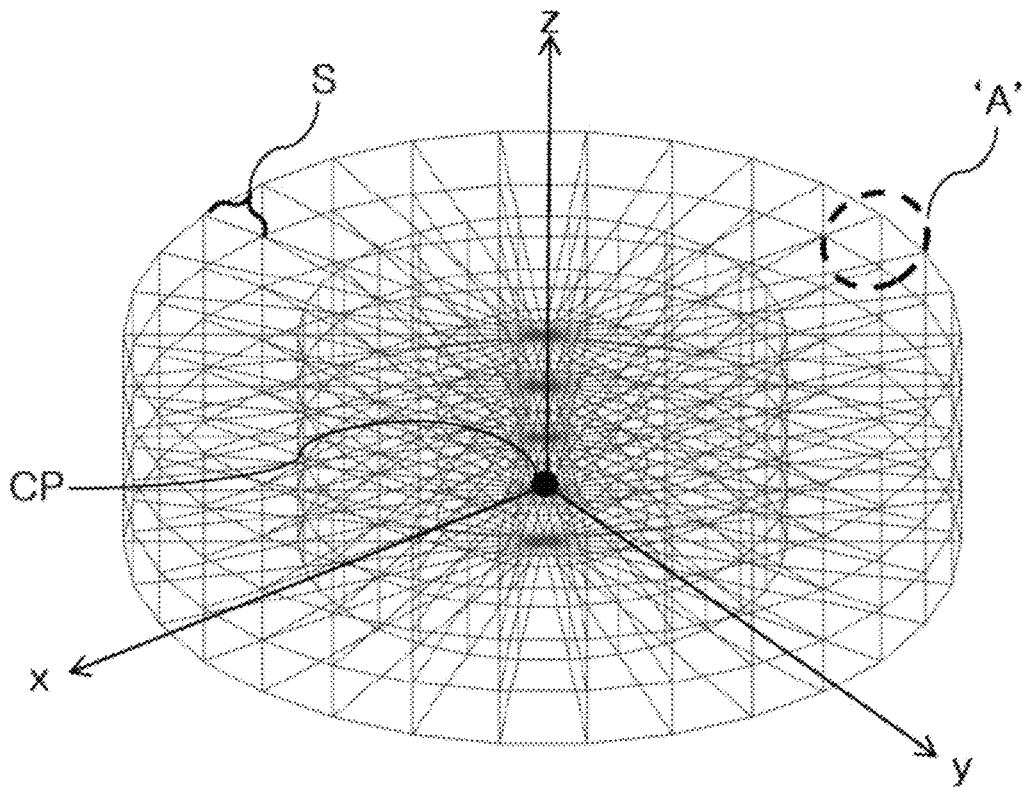
FIG. 6A is a view exemplarily showing a cylindrical three-dimensional (3D) grid map.
Figure 6B:
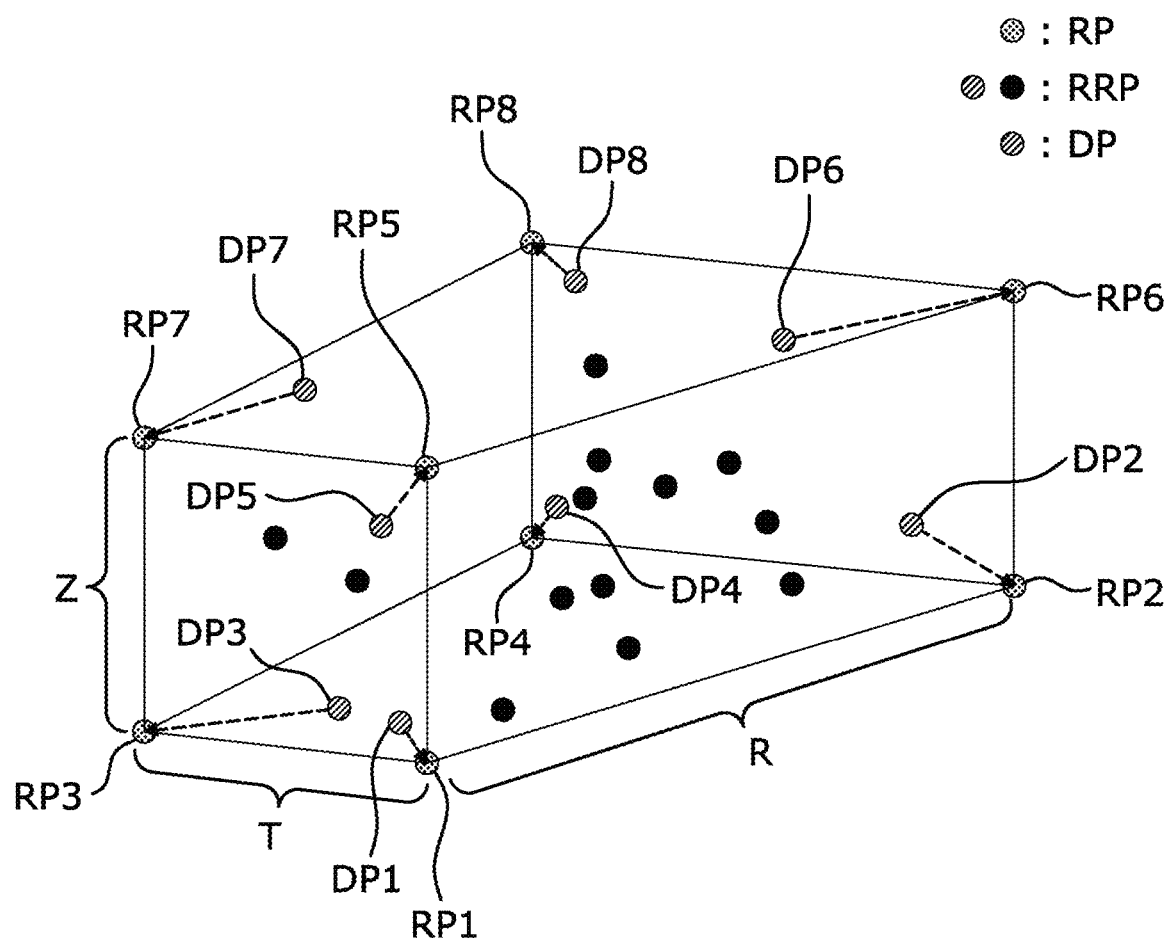
FIG. 6B is a view showing portion 'A' shown in FIG. 6A, in other words, each voxel constituting the 3D grid map.

FIG. 6A is a view exemplarily showing a cylindrical three-dimensional (3D) grid map, and FIG. 6B is a view showing portion 'A' shown in FIG. 6A, in other words, each voxel (or a unit voxel) constituting the 3D grid map.

The 3D grid map shown in FIG. 6A and the unit voxel shown in FIG. 6B are given as examples to help understand clustering according to the embodiment. The embodiments are not limited to any specific shapes of 3D grid map or unit voxel.

Step 231 of performing the main start initialization shown in FIG. 4 may update tuning parameters according to the operating mode (step 302).

The main start initialization may be performed when the host vehicle equipped with the LiDAR sensor is started (or booted). As the operating mode, there may be a logic mode and a file mode (or a tuning mode). In the logic mode, a constant value defined in code is updated. In the file mode, a constant value defined in a data file is updated. Here, the data file may be a file for setting a tuning value.

After step 302, a constant table is updated according to the tuning value (step 304). As the types of the constant table, there is a table in which high-altitude and low-altitude Rho values are stored for each Rho index (RhoIdx) of the voxel and there is also a RhoIdx table in which the Rho indexes are stored for the high-altitude and the low-altitude Rho values for enabling rapid search of the Rho index (RhoIdx) based on the high-altitude and the low-altitude Rho values are stored.

Here, the index may be used to indicate an order or may mean an address of a stack in a memory in which a result of computation is stored. "Rho" corresponds to a radius in a polar coordinate system. The Rho value of a certain point is the straight-line distance from the host vehicle to the corresponding point when the host vehicle is the center of the circle. In other words, when the host vehicle is the center of the circle, the Rho value is the radius of the circle. "High altitude" refers to a height higher than or equal to a predetermined level, and "low altitude" refers to a height lower than the predetermined level. For example, a high-altitude structure may be a structure having a height higher than the height of the host vehicle equipped with the LiDAR sensor. The high-altitude structure may be, for example, a building or a sign. The predetermined level may be, for example, 4 m. However, the embodiments are not limited to any specific value of the predetermined level. A low-altitude structure may be a structure having a height lower than the height of the high-altitude structure.

The 3D grid map shown in FIG. 6A may comprise a plurality of unit voxels (hereinafter briefly referred to as "voxels"), and each of the plurality of voxels may have the shape shown in FIG. 6B. Referring to FIG. 6B, each voxel may have an R value (or a Rho value), a T value, and a Z value. The R value of each voxel may be defined as shown in FIG. 6B or may be defined as the distance from the center CP of the 3D grid map shown in FIG. 6A to any one of reference points RP (RP1 to RP8). The R value shown in FIG. 6A may correspond to the size S of the grid of each voxel. The size S of the grid may be flexibly and variably tuned within the entire area. For example, the grid may be implemented such that the lengths of the unit voxels gradually increase in the direction of R.

In step 304, only the table related to the Rho value is updated, and the tables related to the T value and the Z value shown in FIG. 6B are not updated. The reason for this is that the Rho value may be a variable value, but the T value and the Z value may be fixed values and thus may not be subject to the update.

In step 304, the updating the constant table may be, for example, a concept of a hash function for updating a hash table, which is present in order to improve the speed of a search algorithm.

After step 304, reference points RP of the voxels are obtained according to the tuning value (step 306). According to the embodiment, reference points of all of the voxels in the 3D grid map shown in FIG. 6A may be obtained once and stored during initial booting and may then be used in step 230A shown in FIG. 4.

For example, referring to FIG. 6B, eight vertices of each voxel may be obtained as reference points RP (RP1 to RP8). Here, the eight reference points RP1 to RP8 of each voxel are virtual points, rather than actual points included in the point cloud acquired through the LiDAR sensor 110.

Referring again to FIG. 4, after step 231, the acquired point cloud is preprocessed (step 233). Hereinafter, the preprocessing in step 233 is referred to as "clustering preprocessing" in order to distinguish the same from the preprocessing in step 220 shown in FIG. 2.

In step 233, parameters to be used when clustering the point cloud in scan units may be initialized. Hereinafter, the initialization in step 233 is referred to as "tuning start initialization" in order to distinguish the same from the initialization in step 231 shown in FIG. 4.

The parameters initialized in the main start initialization in step 231 may be parameters that do not change according to a step, whereas the parameters initialized in the tuning start initialization may be parameters that change according to a step. With this exception, the tuning start initialization may be performed in the same manner as the main start initialization, and thus a duplicate description thereof has been omitted.

In addition, the result of performing clustering in step units in step 233 may be initialized. Hereinafter, this initialization is referred to as "step initialization" in order to distinguish the same from the main start initialization and the tuning start initialization.

For example, the step initialization may include a process of selectively removing the results of computation performed in a step prior to the current step (hereinafter referred to as a "previous step") in relation to the voxels of the 3D grid map. In addition, the step initialization may further include a process of selectively removing the results of computation performed in the previous step in relation to the cluster.

In some cases, steps 231 and 233 may be omitted from step 230A shown in FIG. 4.

According to the embodiment, as shown in FIG. 1, the clustering unit 130 may include a grid map generator 132 and a labeling unit 134.

After step 233, a 3D grid map is generated using the point cloud acquired through each LiDAR sensor 110 (step 235). Step 235 may be performed by the grid map generator 132. In other words, the grid map generator 132 generates a 3D grid map using the point cloud acquired through each LiDAR sensor 110 and outputs the generated 3D grid map to the labeling unit 134.

Figure 7:
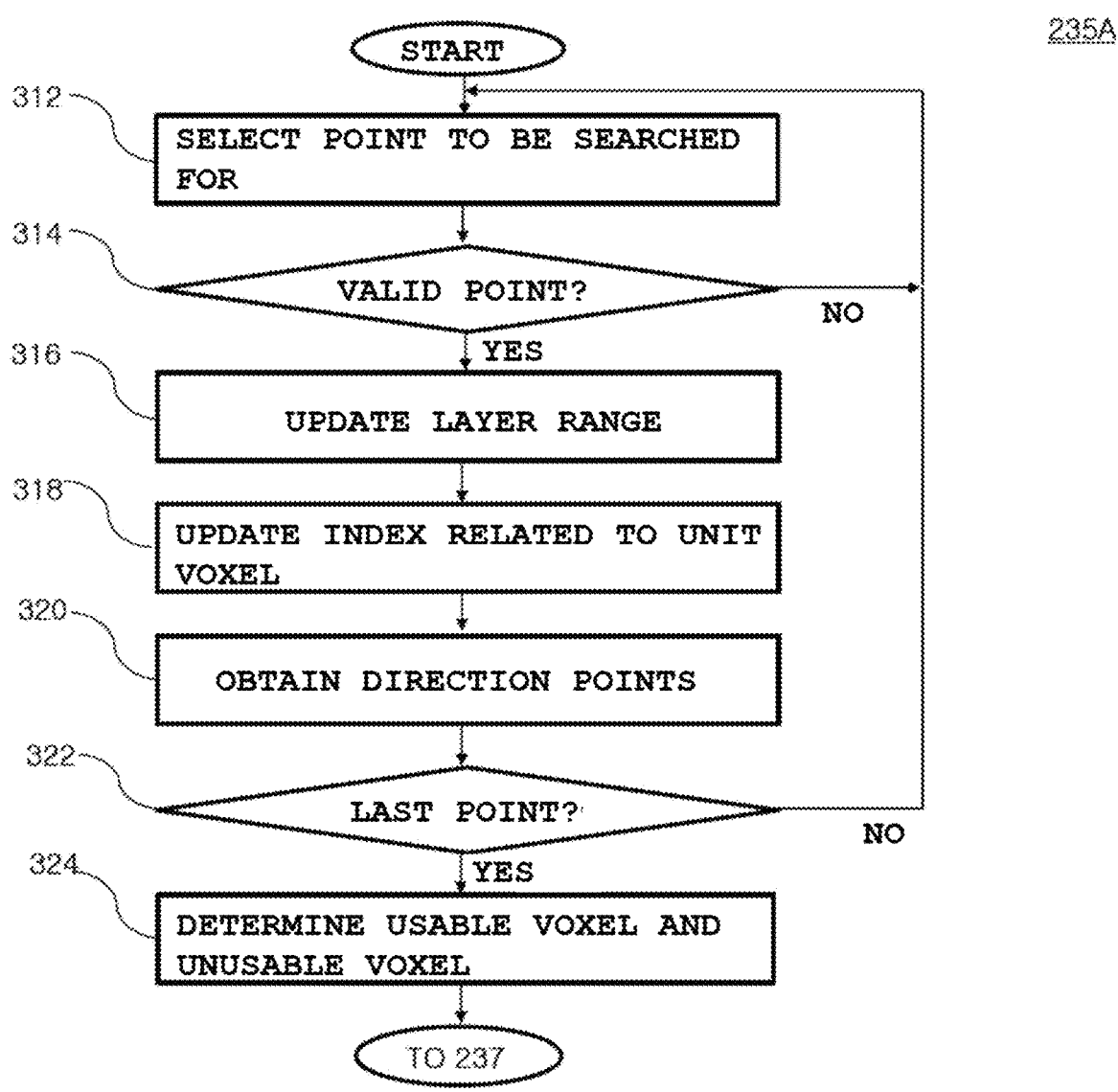
FIG. 7 is a flowchart showing an embodiment of step 235 shown in FIG. 4.

FIG. 7 is a flowchart showing an embodiment 235A of step 235 shown in FIG. 4.

As described above, a plurality of LiDAR sensors 110 may be mounted in the host vehicle. In this case, step 235A shown in FIG. 7 may be performed on each of the points included in the point cloud acquired by each of the plurality of LiDAR sensors 110.

First, points to be searched for in the point cloud acquired by each LiDAR sensor 110 are selected (step 312).

After step 312, whether each of the points included in the point cloud is a valid point required to generate the 3D grid map is checked (step 314).

For example, among the points included in the point cloud, a point that is an object point or an interpolation point and has coordinates within a threshold of a region of interest (ROI) may be determined to be a valid point. Here, the threshold of the ROI may be a value for recognition of an object and may be set in advance.

When the point selected in step 312 is not a valid point (NO in step 314), the process proceeds to step 312 to select another point.

When the point selected in step 312 is a valid point (YES in step 314), the layer range of the valid point included in the unit voxel is updated (step 316).

After step 316, the number of valid points included in the unit voxel, the number of interpolation points, and the identification numbers may be updated (step 318). To this end, for example, an index related to the number of valid points included in the unit voxel, an index related to the number of interpolation points, and an index related to the identification numbers may be updated in step 318 as indexes related to the unit voxel.

Although it is illustrated in FIG. 7 that step 318 is performed after step 316, the embodiments are not limited thereto. In other words, according to another embodiment, step 316 may be performed after step 318, or step 316 and step 318 may be performed at the same time.

After step 318, direction points DP are obtained from among valid points using the reference points of the 3D grid map (step 320). The direction points are one of the characteristics that are representative of each voxel. The points closest to the reference points of each voxel may be selected as the direction points. Here, the points closest to the reference points may be selected from among the actually present points that are included in the point cloud and are acquired by the LiDAR sensor 110. Accordingly, the direction points selected in step 320 may be points that are actually present. However, not all direction points are selected from among the points included in the point cloud. This is described in detail below with reference to FIGS. 15A, 15B, and 15C.

For example, referring to FIG. 6B, among the points RRP that are included in the voxels and are present in the point cloud (hereinafter referred to as "actual points"), the points closest to the eight reference points RP1 to RP8 may be determined to be the direction points DP1 to DP8. In other words, actual points closest to the reference points RP1 to RP8, which correspond to the vertices of the unit voxel, among the valid points, may be obtained as the direction points.

The direction points may be used in step 237 shown in FIG. 4.

After step 320, whether the last point is selected in step 312 and the above-described operation is performed on the last point is checked (step 322). In other words, whether steps 312 to 320 are performed on all of the points included in the point cloud acquired by each LiDAR sensor 110 is checked. When it is not the last point (NO in step 322), the process proceeds to step 312 to select another point to be searched for, and steps 314 to 320 are performed on the other selected point.

On the other hand, when it is the last point (YES in step 322), among the voxels obtained as a result of checking all of the points of the point cloud, a voxel that is not to be utilized for clustering (hereinafter referred to as an "unusable voxel") and a voxel that is to be utilized for clustering (hereinafter referred to as a "usable voxel") are determined (step 324). Because the unusable voxel, which is not to be utilized for clustering, is excluded through step 324, the computation time taken for clustering, which is performed below, may be reduced.

FIG. 8 is a flowchart showing an embodiment 324A of step 324 shown in FIG. 7.

Referring to FIG. 8, whether the voxel does not belong to an ROI (hereinafter referred to as a "first ROI") is checked (step 332). The threshold of the ROI used in step 314 described above is an ROI for the point, which is used to check the validity of the point, whereas the first ROI in step 332 is an ROI of the voxel.

When the voxel does not belong to the first ROI (YES in step 332), the voxel is determined to be an unusable voxel (step 340).

On the other hand, when the voxel belongs to the first ROI (NO in step 332), the number of valid points included in the voxel is checked (step 334). For example, when the voxel belongs to the first ROI, whether the number of valid points included in the voxel is less than a threshold number is checked. Here, the threshold number may be set in advance.

When the number of valid points included in the voxel is less than the threshold number (YES in step 334), the voxel is determined to be an unusable voxel (step 340). However, when the number of valid points included in the voxel is greater than or equal to the threshold number (NO in step 334), the intensities of the valid points included in the voxel are checked (step 336).

In one example, when the number of valid points included in the voxel is greater than or equal to the threshold number, the intensity of each of the valid points included in the voxel is checked. When the number of valid points that do not have a threshold intensity is greater than a predetermined number (NO in step 336), the voxel may be determined to be an unusable voxel (step 340).

In another example, when the number of valid points included in the voxel is greater than or equal to the threshold number (NO in step 334), an average value of the intensities of the valid points included in the voxel is calculated, and when the average value is less than a predetermined intensity (NO in step 336), the voxel may be determined to be an unusable voxel (step 340).

When the average value of the intensities of the valid points is greater than or equal to the predetermined intensity, the number of layers in which the voxel is formed is checked (step 338). In other words, when the number of valid points that do not have the threshold intensity is less than or equal to the predetermined number or when the average value of the intensities of the valid points included in the voxel is greater than or equal to the predetermined intensity, step 338 may be performed.

Step 338 is a process of updating the layer range included in the unit voxel. Here, the layer range may correspond to the layer range updated in step 316 shown in FIG. 7.

When the number of layers in which the voxel is formed is one (YES in step 338), the voxel is determined to be an unusable voxel (step 340). On the other hand, when the number of layers in which the voxel is formed is a plural number (NO in step 338), the voxel is determined to be a usable voxel (step 342).

In the case illustrated in FIG. 8, a voxel satisfying all of steps 332, 334, 336, and 338 is determined to be a usable voxel, but the embodiments are not limited thereto. In other words, according to another embodiment, a voxel satisfying only any one of steps 332, 334, 336, or 338 may be determined to be a usable voxel. However, as shown in FIG. 8, a voxel satisfying none of steps 332, 334, 336, or 338 may be determined to be an unusable voxel.

Also, as shown in FIG. 8, steps 332 to 338 may be performed in any order.

As a result, as described above, in step 235 shown in FIG. 4, a voxel containing a valid point included in the point cloud may be determined, and whether the voxel is a usable voxel or an unusable voxel may also be determined.

In addition, in order to perform step 235 shown in FIG. 4, at least one of a voxel-RhoIdx-related parameter or a first-ROI-related parameter may be used, but the embodiments are not limited thereto.

Figure 9A:
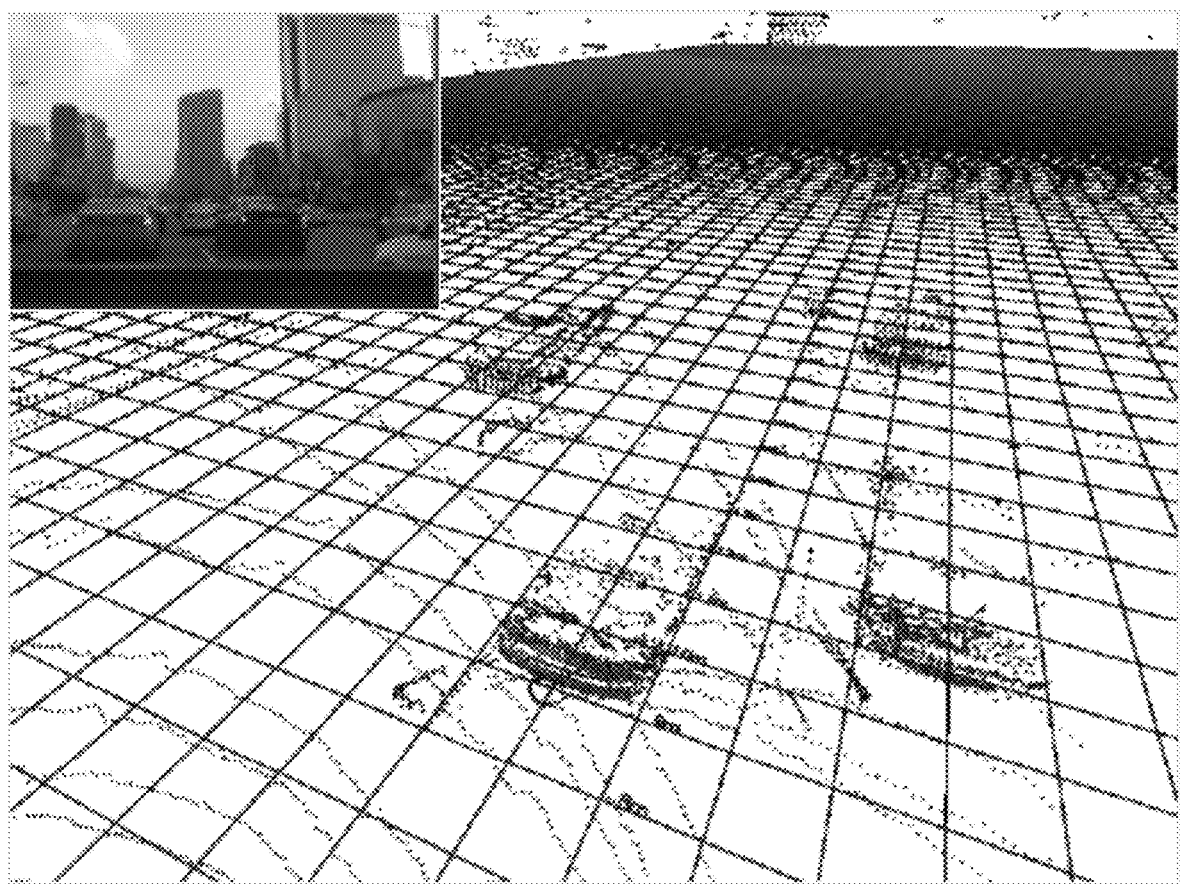
FIG. 9A shows the state before the 3D grid map is generated.
Figure 9B:
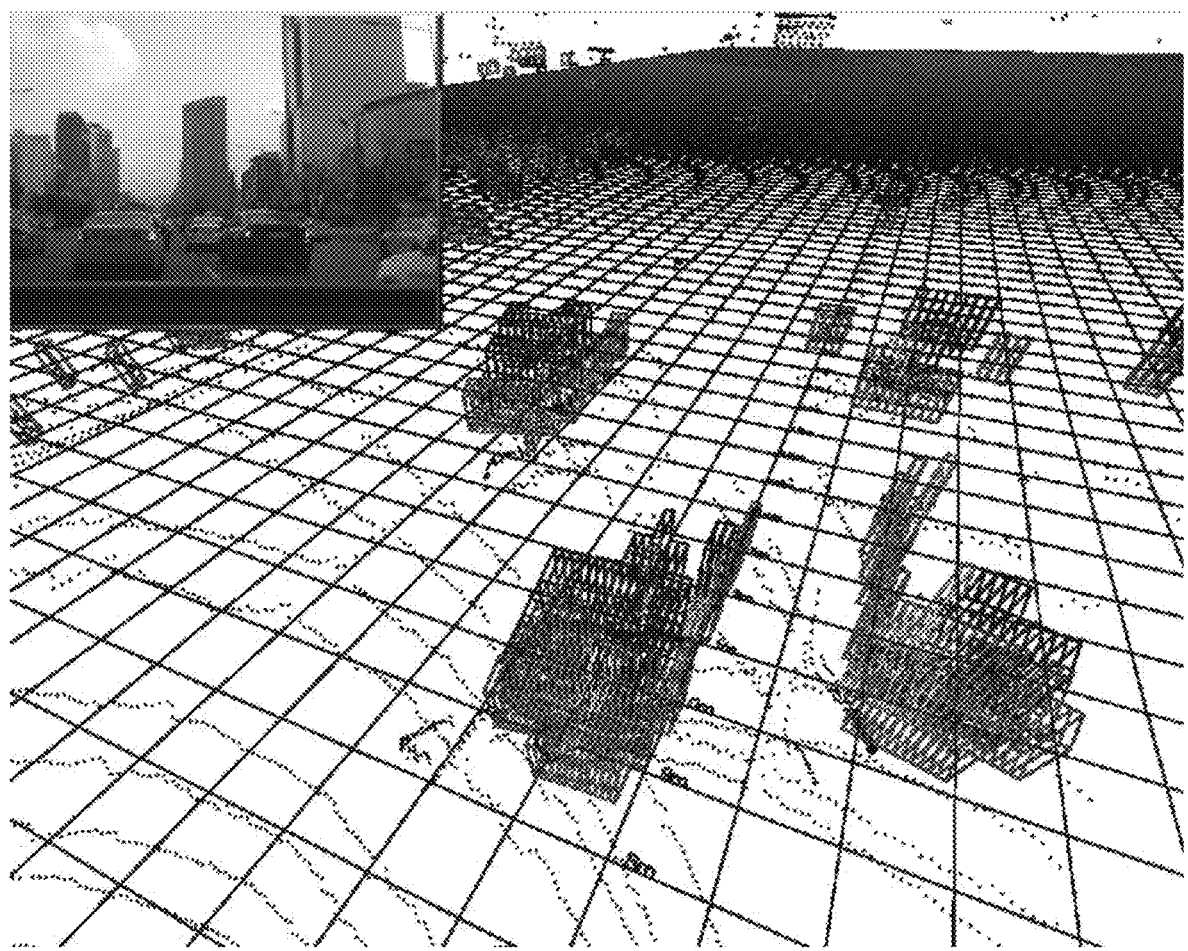
FIG. 9B shows the state after the 3D grid map is generated.

FIG. 9A shows the state before the 3D grid map is generated, and FIG. 9B shows the state after the 3D grid map is generated.

It can be seen that the points shown in FIG. 9A are transformed into the 3D grid maps shown in FIG. 9B through step 235 shown in FIG. 4 described above.

Referring again to FIG. 4, after step 235, voxels present in the 3D grid map may be labeled with one cluster using the direction points of the voxels, and thereafter, whether it is necessary to label the voxels with mutually different clusters may be checked in order to split the cluster (step 237). Here, the "labeling" may be a process of, when two voxels are compared with each other and are determined to satisfy requirements for merging, assigning the same identification number (ID) to the two voxels in order to confirm that the voxels constitute the same cluster.

Step 237 may be performed by the labeling unit 134 shown in FIG. 1. The labeling unit 134 may label voxels present in the 3D grid map, generated by the grid map generator 132, with one cluster using the direction points of the voxels. The labeling unit 134 may also determine whether it is necessary to label the voxels with mutually different clusters. The labeling unit 134 may also split the cluster according to the result of the determination. The labeling unit 134 may also output the result of splitting to the shape analysis unit 140.

Figure 10:
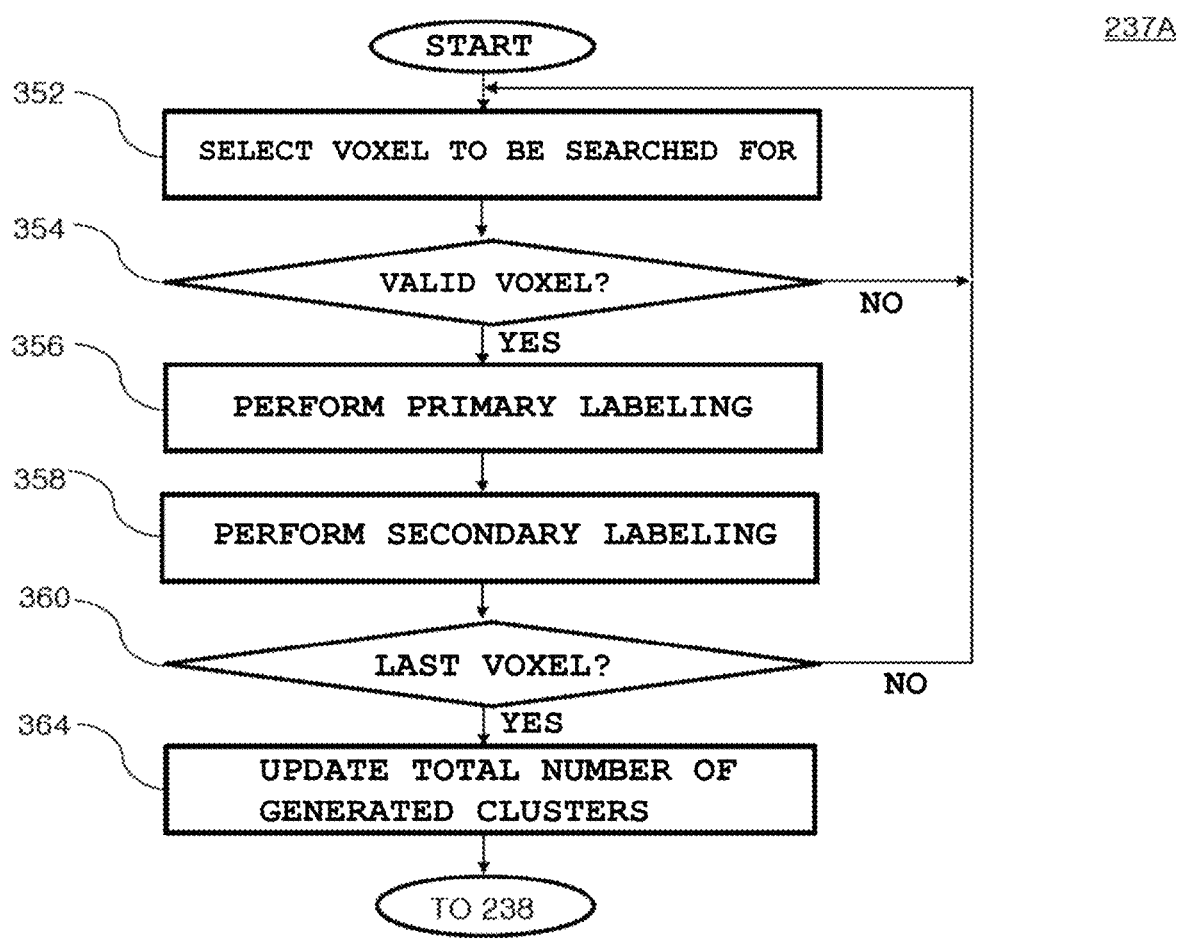
FIG. 10 is a view showing an embodiment of step 237 shown in FIG. 4.

FIG. 10 is a view showing an embodiment 237A of step 237 shown in FIG. 4.

Step 237 shown in FIG. 4 and step 237A shown in FIG. 10 may be performed on each of the voxels included in the 3D grid map obtained as a result of performing step 235 shown in FIG. 4 and step 235A shown in FIG. 7.

Referring to FIG. 10, the usable voxel to be searched for is selected from among the voxels included in the 3D grid map (step 352). Here, the usable voxel to be searched for is a usable voxel on which steps 354 to 364 are to be performed (hereinafter referred to as a "voxel").

After step 352, whether the selected voxel is a voxel that is valid (hereinafter referred to as a "valid voxel") is checked (step 354). When the selected voxel is a voxel that is not valid (hereinafter referred to as an "invalid voxel") (NO in step 354), the process proceeds to step 352 to select another usable voxel.

Figure 11A:
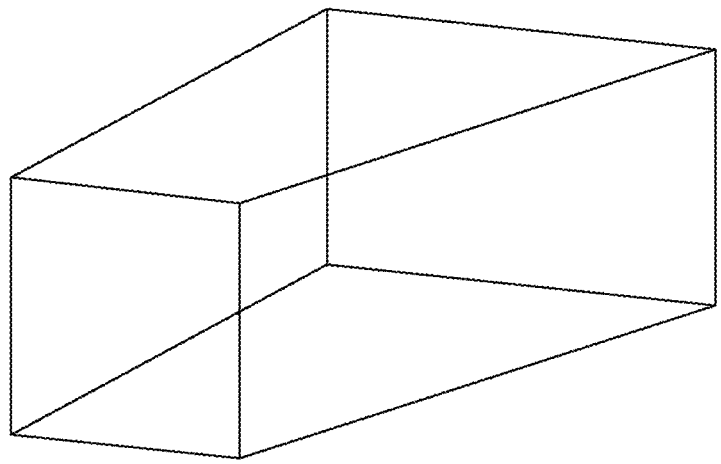
FIGS. 11A, 11B, and 11C show various types of voxels.
Figure 11B:
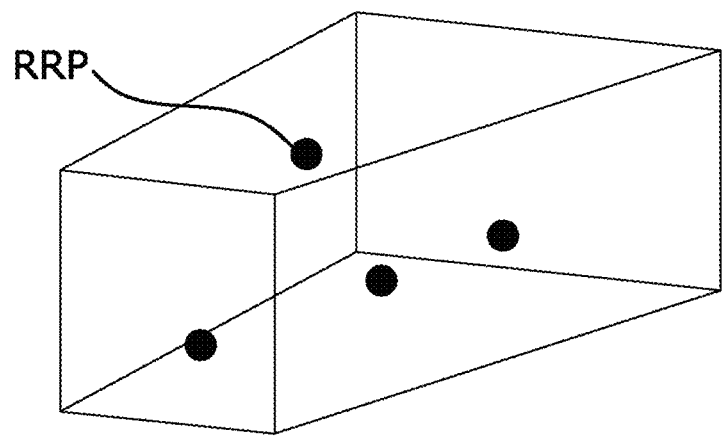
Figure 11C:
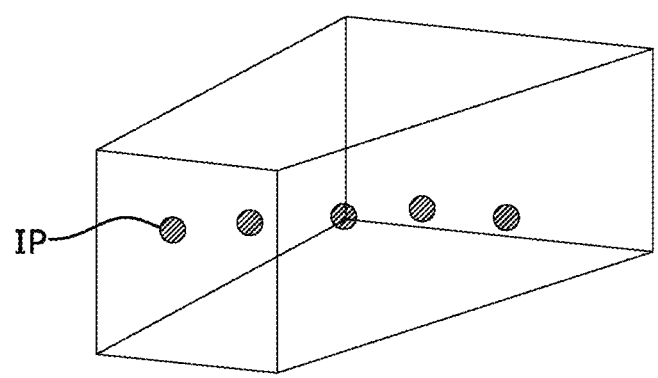

FIGS. 11A, 11B, and 11C show various types of voxels.

For example, whether the voxel is a voxel that does not have an actual point included in the point cloud, as shown in FIG. 11A, is checked. When the voxel is a voxel that does not have an actual point, as shown in FIG. 11A, the voxel is determined to be an invalid voxel.

In addition, whether the voxel is a voxel that has undergone primary or secondary labeling in step 356 or step 358 shown in FIG. 10 is checked. For example, even though the voxel has actual points, as shown in FIG. 11B, the voxel may be determined to be an invalid voxel when the voxel has already undergone labeling.

In addition, as shown in FIG. 11C, when the voxel has only interpolation points IP, rather than have actual points included in the point cloud, the voxel may be determined to be an invalid voxel.

In other words, when the voxel has the actual points included in the point cloud, for example, the valid points, when the voxel has not undergone primary or secondary labeling, and when the voxel does not have only the interpolation points IP generated through interpolation, the voxel is determined to be a valid voxel (YES in step 354).

When the voxel selected in step 352 is a valid voxel, primary labeling is performed in order to assign the same identification number or mutually different identification numbers to the voxels using the direction points of the valid voxels (step 356). To this end, a plurality of voxels may be selected in step 352, and step 354 may be performed on the plurality of selected voxels.

Figure 12:
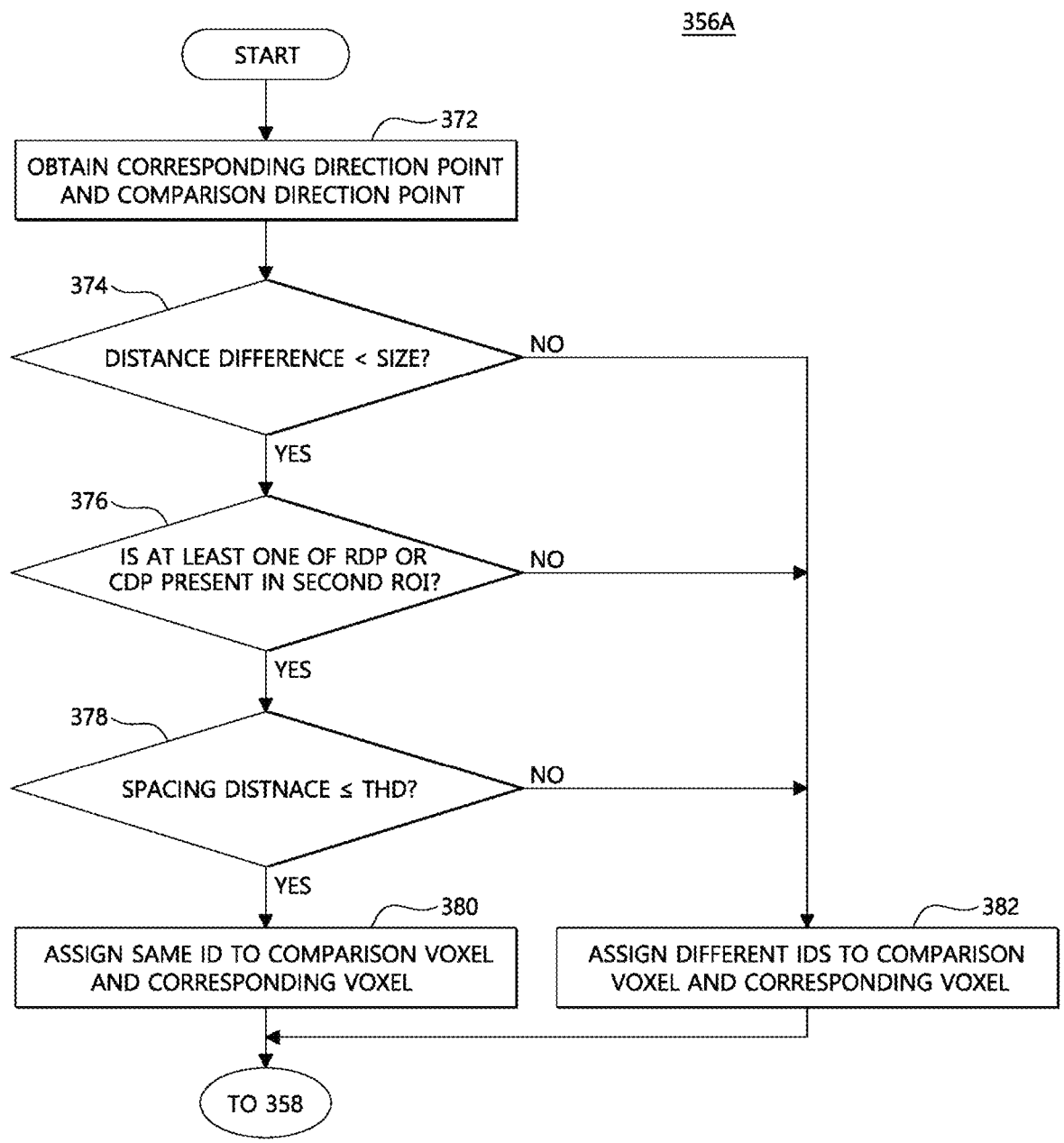
FIG. 12 is a flowchart showing an embodiment of step 356 shown in FIG. 10.
Figure 13:
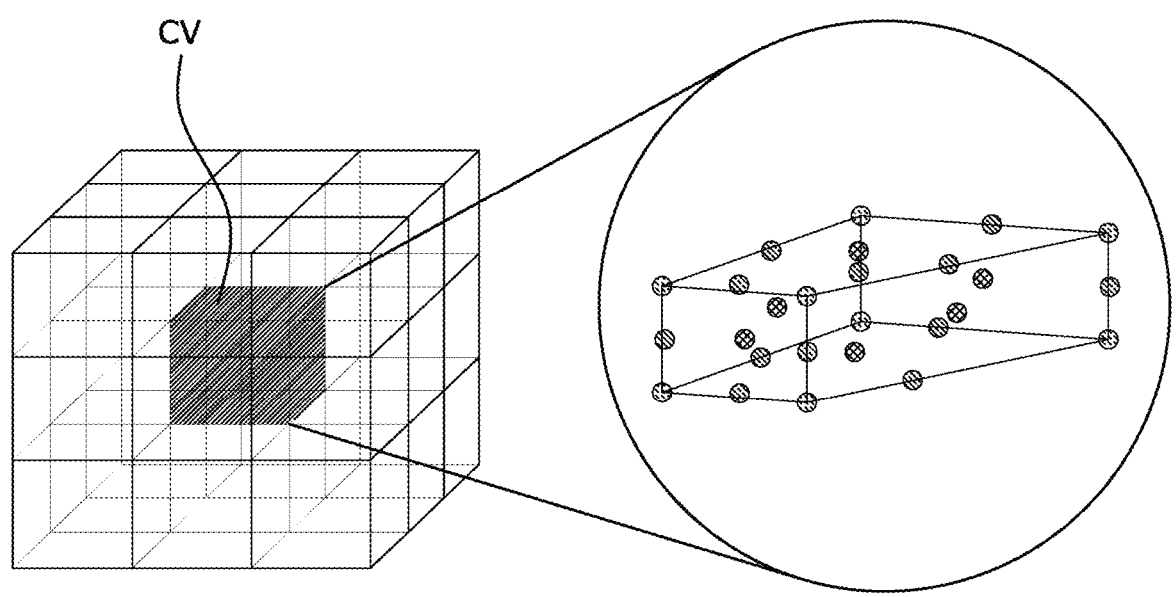
FIG. 13 shows a part of the 3D grid map shown in FIG. 6A.

FIG. 12 is a flowchart showing an embodiment 356A of step 356 shown in FIG. 10, and FIG. 13 shows a part of the 3D grid map shown in FIG. 6A.

In order to explain step 356A, among the valid voxels, a voxel on which the first labeling is to be performed is referred to as a "corresponding voxel", and a voxel located in the vicinity of the corresponding voxel is referred to as a "comparison voxel".

Figure 14:
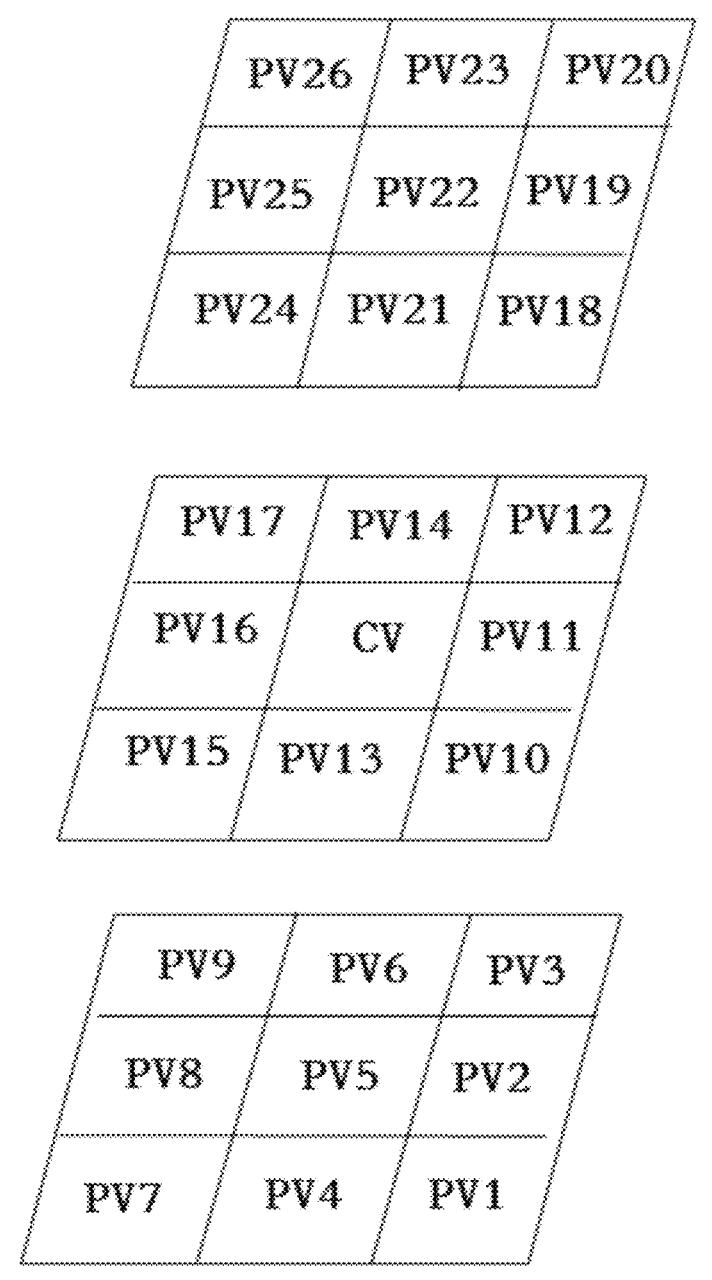

FIG. 14 is a view showing the comparison voxel that is to be compared with the corresponding voxel CV shown in FIG. 13.

A plurality of comparison voxels may be located in the vicinity of the corresponding voxel CV shown in FIG. 13. For example, referring to FIG. 14, nine comparison voxels (first to ninth comparison voxels PV1 to PV9) may be located below the corresponding voxel CV, eight comparison voxels (tenth to seventeenth comparison voxels PV10 to PV17) may be located beside the corresponding voxel CV, and nine comparison voxels (eighteenth to twenty-sixth comparison voxels PV18 to PV26) may be located above the corresponding voxel CV.

Although it is illustrated in FIG. 14 that twenty-six comparison voxels PV1 to PV26 are located in the vicinity of the corresponding voxel CV, the embodiments are not limited thereto. In other words, the number of comparison voxels may be less than twenty-six depending on the position at which the corresponding voxel CV is located in the 3D grid map.

In addition, each of the corresponding voxel CV and the comparison voxels PV (PV1 to PV26) may have twenty-six direction points. Hereinafter, the twenty-six direction points of the corresponding voxel are referred to as "corresponding direction points RDP", and the twenty-six direction points of the comparison voxel are referred to as "comparison direction points CDP".

Figure 15A:
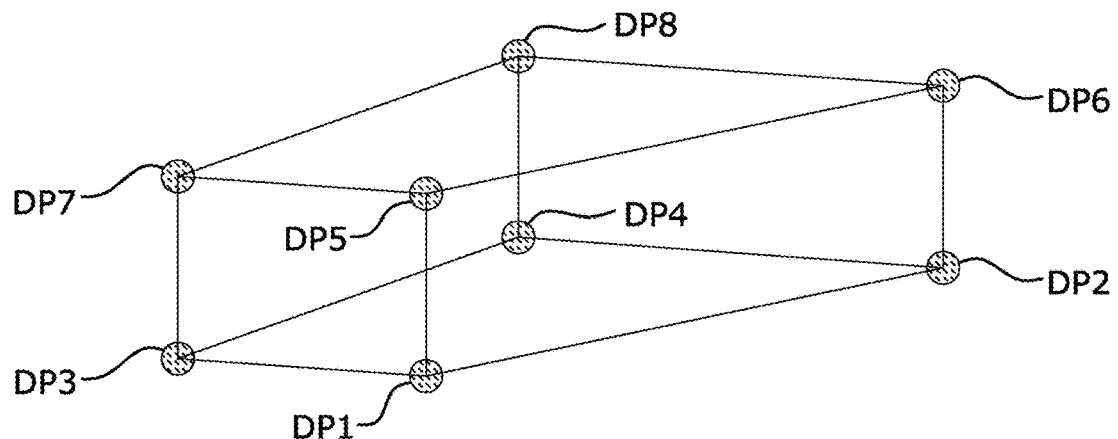
FIGS. 15A, 15B, and 15C are views showing direction points.
Figure 15B:
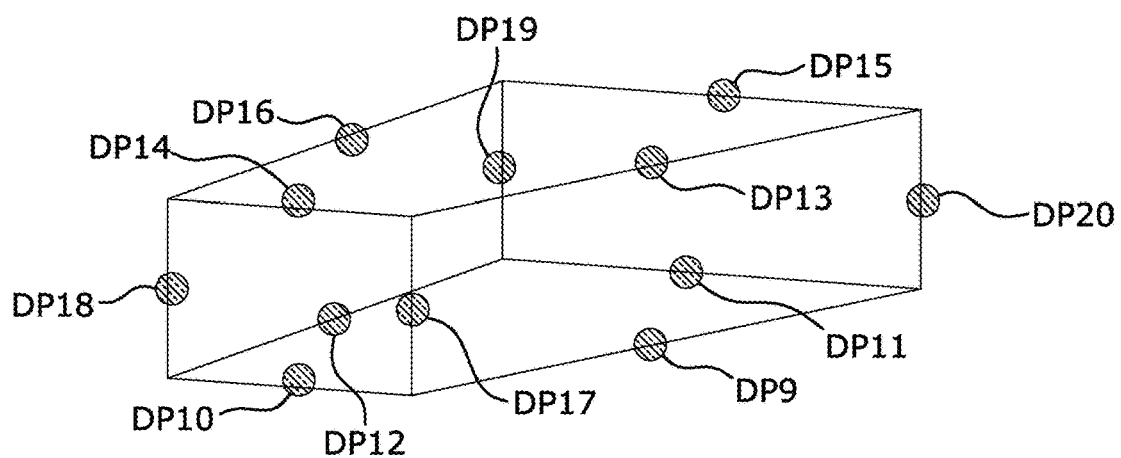
Figure 15C:
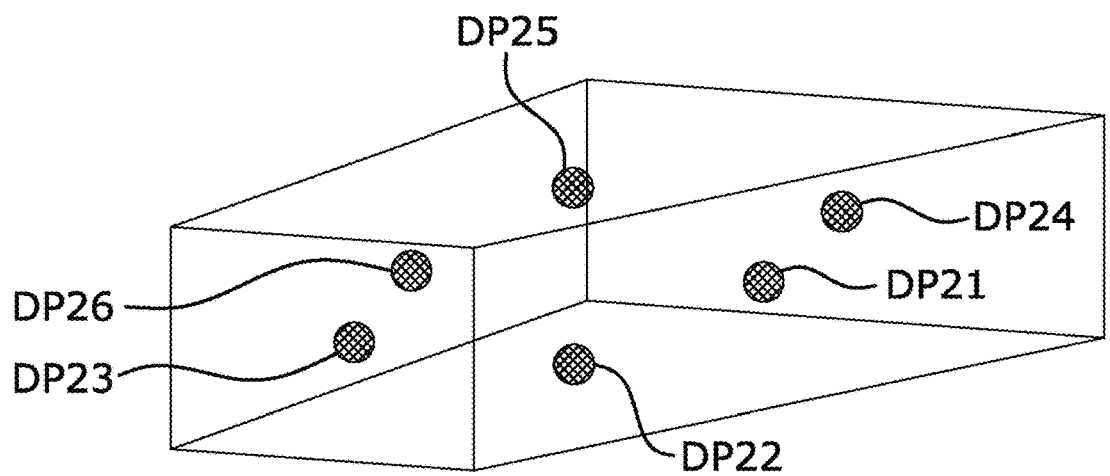

FIGS. 15A, 15B, and 15C are views showing the direction points.

Referring again to FIG. 12, corresponding direction points and comparison direction points are obtained (step 372).

A process of obtaining the corresponding direction points is described below with reference to FIGS. 15A, 15B, and 15C.

As described above with reference to step 320, referring to FIGS. 6B and 15A, among the actual points included in the point cloud, the points closest to the first to eighth reference points RP1 to RP8, which are eight vertices of the corresponding voxel CV, are obtained as the first to eighth corresponding direction points DP1 to DP8. Since the first to eighth corresponding direction points DP1 to DP8 are actual points included in the point cloud, the same is referred to hereinafter as "actual corresponding direction points".

The remaining eighteen corresponding direction points DP9 to DP26 of the corresponding voxel CV are determined using the actual corresponding direction points DP1 to DP8. The ninth to twenty-sixth corresponding direction points DP9 to DP26, which are obtained using the first to eighth corresponding direction points DP1 to DP8, are virtual points that are not included in the point cloud and thus are referred to hereinafter as "virtual corresponding direction points".

Referring to FIG. 15B, twelve corresponding direction points (the ninth to twentieth corresponding direction points DP9 to DP20), which are located at edges between faces in the corresponding voxel CV, are obtained. For example, each of the ninth to twentieth corresponding direction points DP9 to DP20 may be obtained as the average of the actual corresponding direction points located at two vertices formed at both ends of a corresponding one of the edges.

In one example, the average of the coordinates of the first corresponding direction point DP1 and the coordinates of the second corresponding direction point DP2, which are shown in FIG. 15A may be obtained as the coordinates of the ninth corresponding direction point DP9. The coordinates of each of the tenth to twentieth corresponding direction points may also be obtained in this manner.

Subsequently, referring to FIG. 15C, six corresponding direction points (the twenty-first to twenty-sixth corresponding direction points DP21 to DP26), which are located in respective faces of the corresponding voxels CV, are obtained. For example, each of the twenty-first to twenty-sixth corresponding direction points DP21 to DP26 may be obtained as the average of the actual corresponding direction points located at four vertices of a corresponding one of the faces.

In one example, the average of the coordinates of the first corresponding direction point DP1, the coordinates of the second corresponding direction points DP2, the coordinates of the fifth corresponding direction point DP5, and the coordinates of the sixth corresponding direction point DP6 shown in FIG. 15A may be obtained as the coordinates of the twenty-first corresponding direction point DP21. The coordinates of each of the twenty-second to twenty-sixth corresponding direction points DP22 to DP26 may be obtained in this manner.

In the same manner as the above-described manner of obtaining the twenty-six corresponding direction points, twenty-six comparison direction points (first to twenty-sixth comparison direction points DP1 to DP26) may be obtained with respect to each of the comparison voxels PV (PV1 to PV26). Thus, a description of a process of obtaining the first to twenty-sixth comparison direction points DP1 to DP26 has been omitted.

Similar to the first to eighth corresponding comparison direction points, the first to eighth comparison direction points are actual points included in the point cloud, and thus are referred to hereinafter as "actual comparison direction points". Also, since the ninth to twenty-sixth comparison direction points are obtained using the actual comparison direction points, the ninth to twenty-sixth virtual comparison direction points are referred to hereinafter as "virtual comparison direction points".

Referring again to FIG. 12, after step 372, whether a distance difference (or a spacing distance, hereinafter referred to as the "distance difference") between the comparison direction point and the corresponding direction point is less than the size of the corresponding voxel is checked (step 374).

The corresponding direction points of the corresponding voxel CV and the comparison direction points of the twenty-six comparison voxels PV1 to PV26 may be compared with each other as shown in Table 1 below.

TABLE 1

| Comparison voxel No. | (Corresponding direction point, Comparison direction point) |
| --- | --- |
| PV1 | (DP1, DP8) |
| PV2 | (DP9, DP16) |
| PV3 | (DP2, DP7) |
| PV4 | (DP10, DP15) |
| PV5 | (DP22, DP25) |
| . . . | . . . |
| PV26 | (DP8, DP1) |

Referring to Table 1, in order to compare the twenty-six comparison voxels PV1 to PV26, which are located in the vicinity of the corresponding voxel CV, with the corresponding voxel CV, the comparison direction point closest to the corresponding direction point, among the twenty-six comparison direction points of each of the twenty-six comparison voxels PV1 to PV26, is compared with the corresponding direction point.

For example, referring to FIG. 14, when comparing the first comparison voxel PV1 with the corresponding voxel CV, the first corresponding direction point DP1 closest to the first comparison voxel PV1 is selected from among the twenty-six corresponding direction points of the corresponding voxel CV and the eighth direction point DP8 closest to the corresponding voxel CV is selected from among the twenty-six comparison direction points of the first comparison voxel PV1. Then, the selected first corresponding direction point DP1 and the selected eighth comparison direction point DP8 are compared with each other.

As shown in Table 1 above, the corresponding direction point and the comparison direction point are compared with each other to obtain the distance differences therebetween corresponding to the R value, the T value, and the Z value. At this time, the sizes of the R value, the T value, and the Z value of the corresponding voxel CV are obtained. Thereafter, whether the distance difference corresponding to the R value is less than the size of the R value of the corresponding voxel CV is checked. Whether the distance difference corresponding to the T value is less than the size of the T value of the corresponding voxel CV is checked. Whether the distance difference corresponding to the Z value is less than the size of the Z value of the corresponding voxel CV is checked.

When the distance difference between the corresponding direction point and the comparison direction point is not less than the size of the corresponding voxel CV (NO in step 374), labeling is performed such that mutually different IDs are assigned to the corresponding voxel CV and the comparison voxel (step 382).

Figure 16:
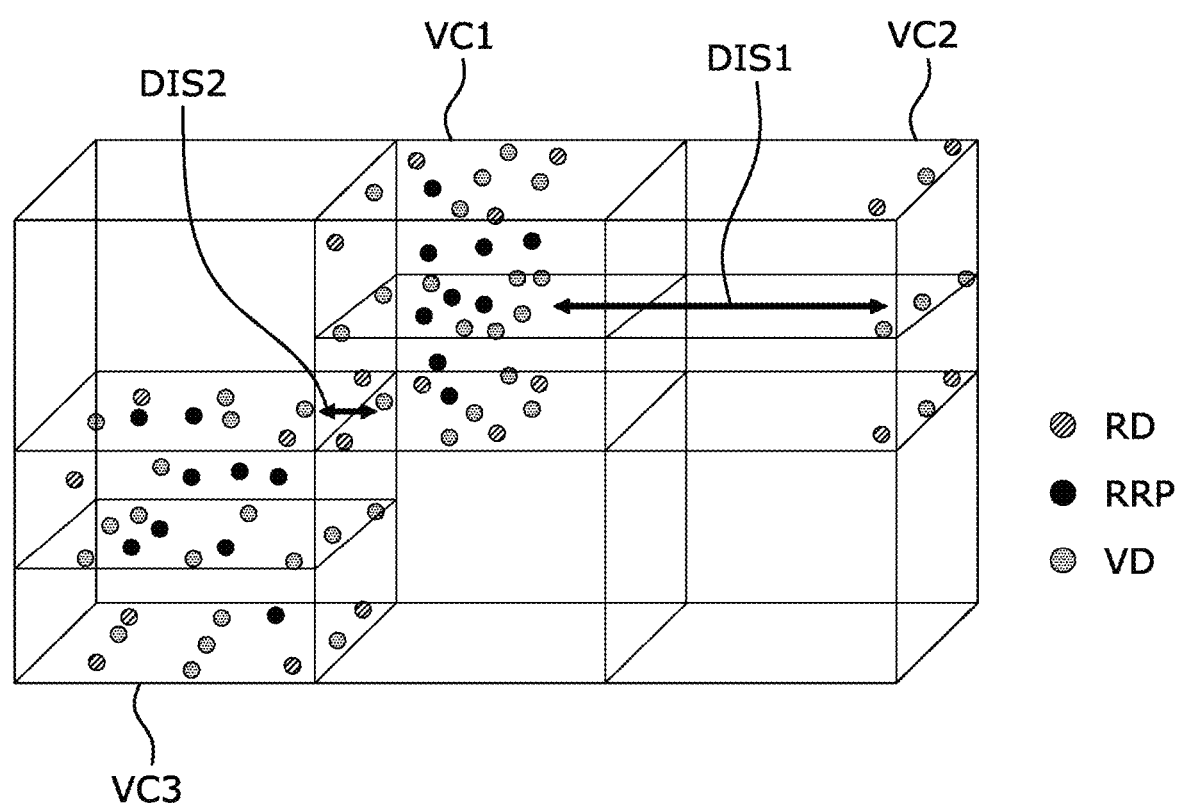
FIG. 16 is a view to help understand step 374 shown in FIG. 12.

FIG. 16 is a view to help understand step 374 shown in FIG. 12. In FIG. 16, "RD" represents an actual corresponding direction point or an actual comparison direction point, "RRP" represents an actual point present in the point cloud, and "VD" represents a virtual corresponding direction point or a virtual comparison direction point.

Referring to FIG. 16, assuming that a first voxel VC1 is the corresponding voxel CV and that second and third voxels VC2 and VC3 are comparison voxels, the distance difference DIS1 between the corresponding direction point of the first voxel VC1 and the comparison direction point of the second voxel VC2 is greater than the size of the first voxel VC1. Thus, mutually different IDs may be assigned to the first voxel VC1 and the second voxel VC2. On the other hand, the distance difference DIS2 between the corresponding direction point of the first voxel VC1 and the comparison direction point of the third voxel VC3 is less than the size of the first voxel VC1 (YES in step 374), and thus the process proceeds to step 376.

Figure 17A:
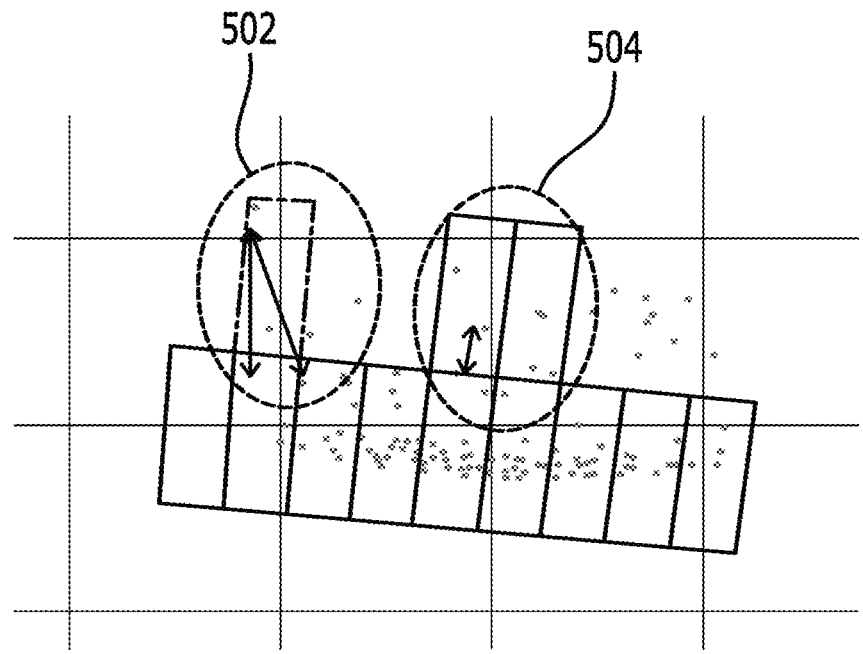
FIGS. 17A and 17B are views to help understand step 374 shown in FIG. 12.
Figure 17B:
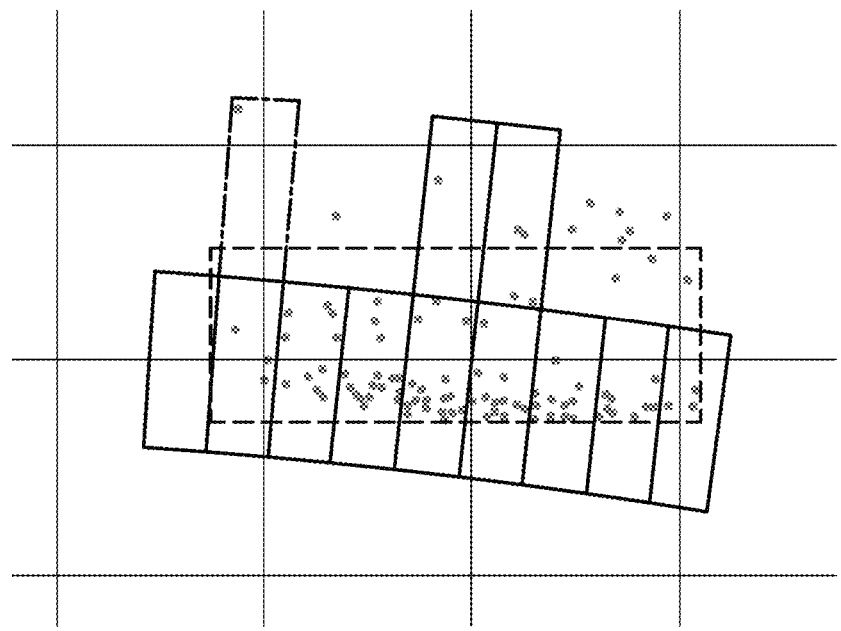

FIGS. 17A and 17B are views to help understand step 374 shown in FIG. 12.

Referring to FIG. 17A, when the distance difference between the corresponding direction point and the comparison direction point is greater than the size of the corresponding voxel, mutually different IDs may be assigned to the corresponding voxel and the comparison voxel (502). On the other hand, when the distance difference between the corresponding direction point and the comparison direction point is less than the size of the corresponding voxel, the process proceeds to step 376. When step 374 is satisfied, as shown in FIG. 17B, the comparison voxel is highly likely to form the same cluster as the corresponding voxel.

However, when the distance difference between the corresponding direction point and the comparison direction point is less than the size of the corresponding voxel CV, whether at least one of the comparison direction point CDP or the corresponding direction point RDP compared with each other as shown in Table 1 above is present in an ROI (hereinafter referred to as a "second ROI") is checked (step 376).

When neither the comparison direction point CDP nor the corresponding direction point RDP is present in the second ROI (NO in step 376), labeling is performed such that mutually different IDs are assigned to the corresponding voxel CV and the comparison voxel (step 382).

On the other hand, when at least one of the comparison direction point CDP or the corresponding direction point RDP is present in the second ROI (YES in step 376), as shown in Table 1, whether the spacing distance between the comparison direction point CDP and the corresponding direction point RDP is less than or equal to a predetermined threshold distance THD is checked (step 378).

Figure 18A:
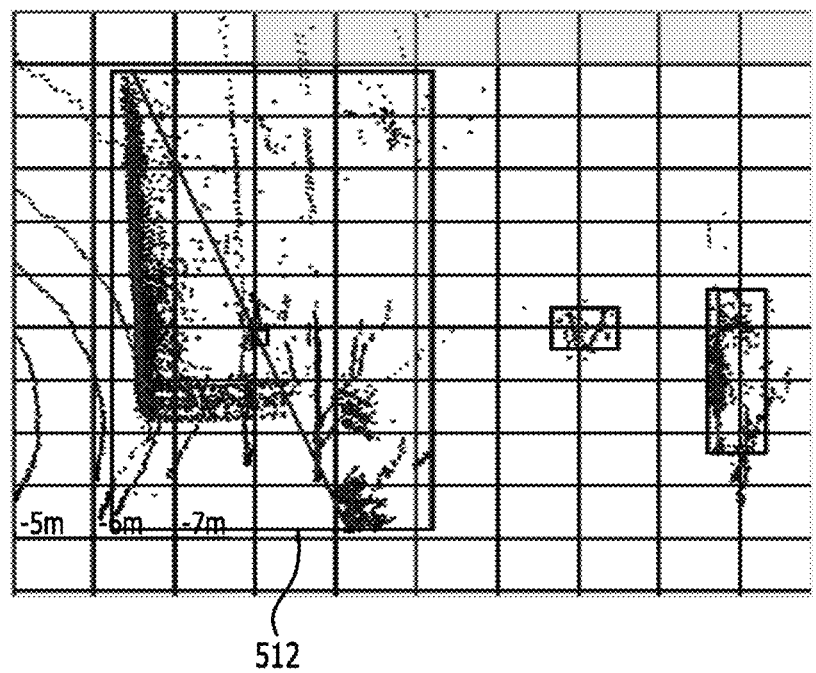
FIGS. 18A and 18B are views showing step 376.
Figure 18B:
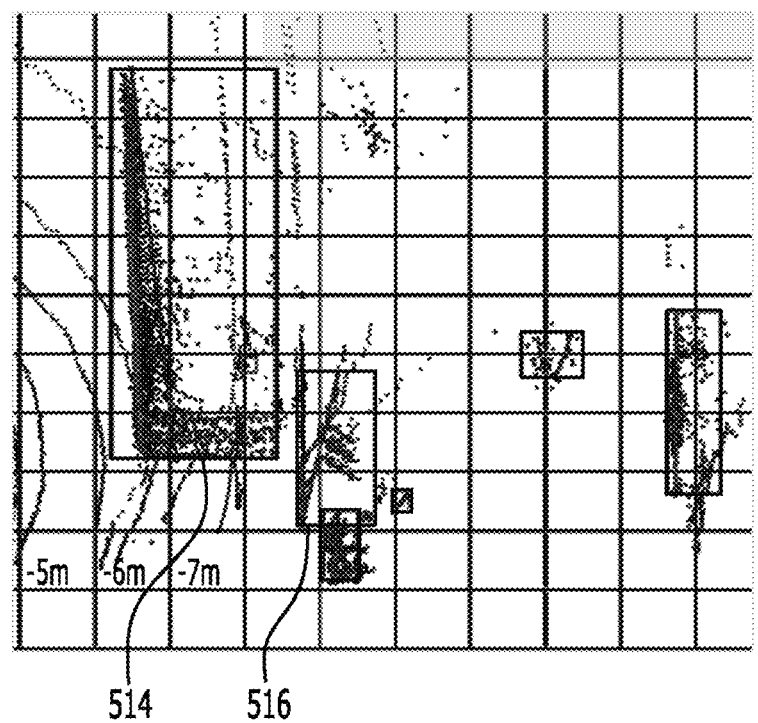

FIGS. 18A and 18B are views showing step 376.

As shown in FIG. 18A, a guardrail and a vehicle may be labeled in a state of being merged with each other. In this case, whether at least one of the comparison direction point or the corresponding direction point is present in the second ROI is checked. When neither the comparison direction point nor the corresponding direction point is present, labeling is performed such that mutually different IDs are assigned to the corresponding voxel and the comparison voxel. Accordingly, the single cluster 512 shown in FIG. 18A may be divided into a cluster 514 associated with the guardrail and a cluster 516 associated with the vehicle, as shown in FIG. 18B.

Further, in the case in which a cylindrical 3D grid map having a large R value is formed, there is a tendency for under-segmentation to occur in the areas to the left and right sides of the vehicle with respect to the x-axis direction, which is the travel direction of the vehicle. Therefore, according to the embodiment, in order to compensate for the limitations of labeling of a cylindrical 3D grid map, labeling may be performed in a manner of applying a greater merging reference threshold value to the second ROI associated with the areas to the left and right sides of the vehicle. Accordingly, the second ROI may be set to be less than the first ROI shown in FIG. 8.

When the spacing distance between the comparison direction point and the corresponding direction point is not equal to or less than a predetermined threshold distance THD (NO in step 378), labeling is performed such that mutually different IDs are assigned to the corresponding voxel and the comparison voxel (step 382).

On the other hand, when the spacing distance between the comparison direction point and the corresponding direction point is equal to or less than the predetermined threshold distance THD (YES in step 378), labeling is performed such that the same ID is assigned to the corresponding voxel CV and to the comparison voxel compared with the corresponding voxel CV (step 380).

In order to perform step 356 shown in FIG. 10 or step 356A shown in FIG. 12, various parameters such as the second ROI and the predetermined threshold distance THD may be used.

Figure 19A:
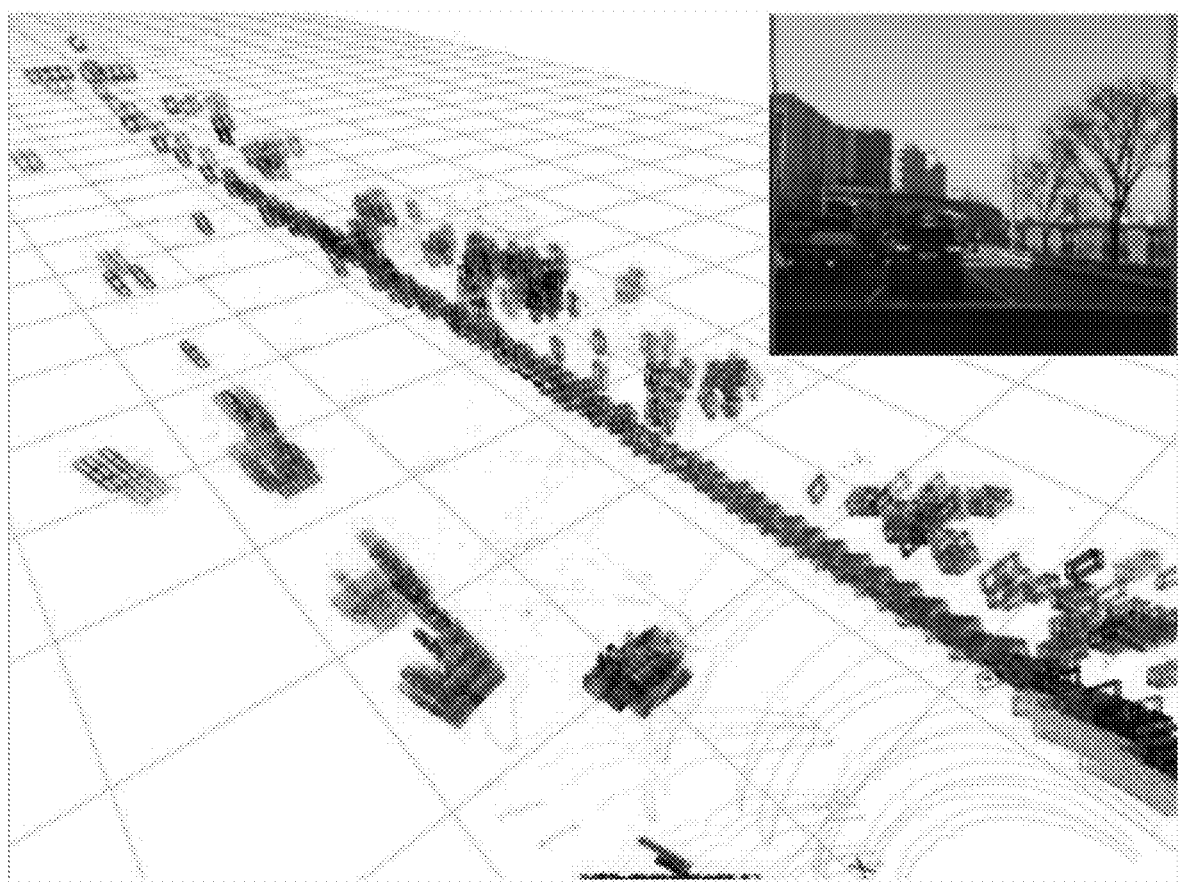
FIGS. 19A and 19B are views for explaining step 356 shown in FIG. 10 or step 356A shown in FIG. 12.
Figure 19B:
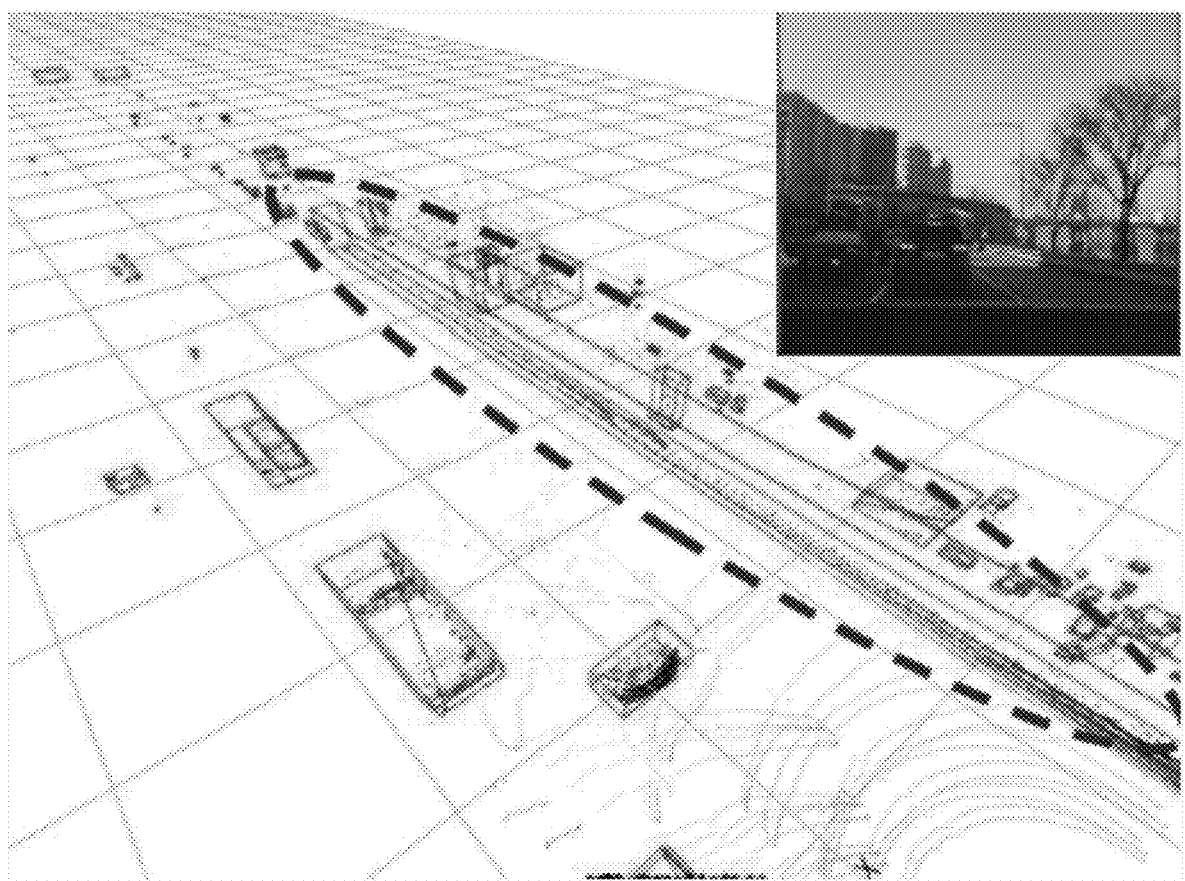

FIGS. 19A and 19B are views for explaining step 356 shown in FIG. 10 or step 356A shown in FIG. 12.

For example, the result shown in FIG. 19B may be obtained by performing the primary labeling on the 3D grid map shown in FIG. 19A.

Meanwhile, referring again to FIG. 10, after step 356, the secondary labeling may be performed such that the voxels to which the same identification number has been assigned as the result of performing the primary labeling are inspected, and mutually different identification numbers are assigned to these voxels (step 358).

Figure 20:
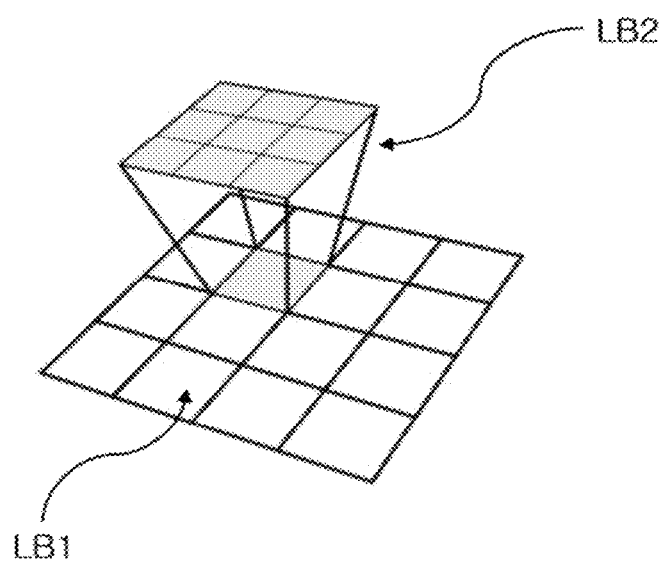
FIG. 20 is a view exemplarily showing secondary labeling in step 358 shown in FIG. 10.

FIG. 20 is a view exemplarily showing the secondary labeling in step 358 shown in FIG. 10.

As shown in FIG. 20, the secondary labeling LB2 may be performed by applying a condition different from that in the primary labeling to the result LB1 of the primary labeling. In other words, the secondary labeling may be performed on the voxels to which the same ID has been assigned as the result of the primary labeling, and mutually different IDs may be assigned to these voxels when a specific condition is satisfied. Accordingly, the first cluster, which is the result of performing the primary labeling, may be split (or divided) into a plurality of second clusters through the secondary labeling.

In one example, whether the voxels to which the same identification number has been assigned through the primary labeling are voxels generated in association with a boundary of a road may be checked. Here, the specific condition corresponds to whether the voxels to which the same identification number has been assigned belong to a large first cluster generated in association with a boundary of a road.

When this specific condition is satisfied, the secondary labeling may be performed to split the first cluster such that one more cluster associated with an area close to the host vehicle is generated.

According to the embodiment, the following data or information may be used in order to determine whether to assign mutually different identification numbers to the voxels to which the same identification number has been assigned. The data or information includes the minimum value and the maximum value of the x-axis coordinate and the minimum value of the y-axis coordinate of each of the voxels to which the same identification number has been assigned through the primary labeling and the signs of the maximum value and the minimum value of the y-axis coordinate of the center point of each of the voxels For example, when the minimum value (min) and the maximum value (max) of the x-axis coordinate and the minimum value (min) of the y-axis coordinate of each of the voxels to which the same identification number (ID) has been assigned through the primary labeling are predetermined values or greater and when both the minimum value (min) and the maximum value (max) of the y-axis coordinate of the center point of each of the voxels to which the same identification number (ID) has been assigned are negative values or positive values, whether to assign mutually different identification numbers to the voxels to which the same identification number has been assigned may be determined. However, the embodiments are not limited thereto.

Figure 21B:
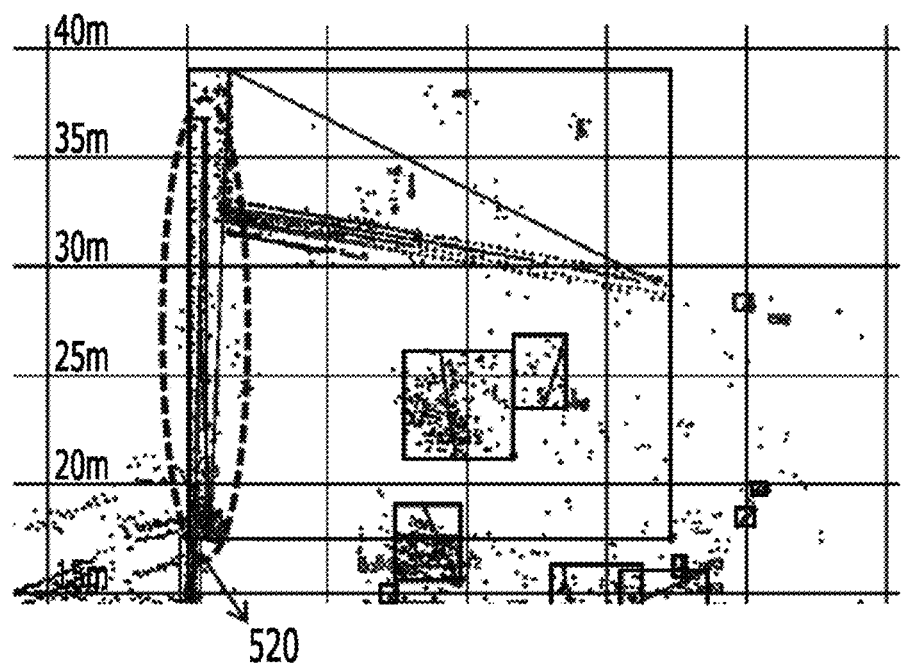

FIGS. 21A and 21B are views for explaining the secondary labeling.

Referring to the result of the primary labeling shown in FIG. 21A, the voxels that have the same R index and the largest or smallest T index are indicated by "RP". In this case, when the secondary labeling is performed on the result of the primary labeling shown in FIG. 21A, only the voxels indicated by "RP" are labeled, and a second cluster is generated (520).

Step 356 of performing the primary labeling and step 358 of performing the secondary labeling may be performed only on the voxels determined to be usable voxels by performing step 235 shown in FIG. 4 or step 235A shown in FIG. 7. In this case, the time required to perform the primary labeling and the secondary labeling on the unusable voxels included in the 3D grid map is eliminated, and thus the total computation time may be reduced.

Referring again to FIG. 10, whether step 356 and step 358 have been performed on the last voxel is checked (step 360). In other words, whether steps 352 to 358 have been performed on all of the voxels (or the usable voxels) is checked. When steps 352 to 358 have not been performed on all of the voxels (NO in step 360), the process proceeds to step 352 to select other usable voxels to be searched for, and steps 354 to 358 described above are performed thereon.

On the other hand, when steps 352 to 358 have been performed on all of the voxels (YES in step 360), the total number of generated clusters, i.e. the second clusters, is updated (step 364). For example, when the number of the first clusters is stored in step 356, only the number of varied first clusters is updated in step 358, and the result of the update may be regarded as information about the second clusters.

Referring again to FIG. 4, clustering post-processing is performed after step 237 (step 238).

Figure 22:
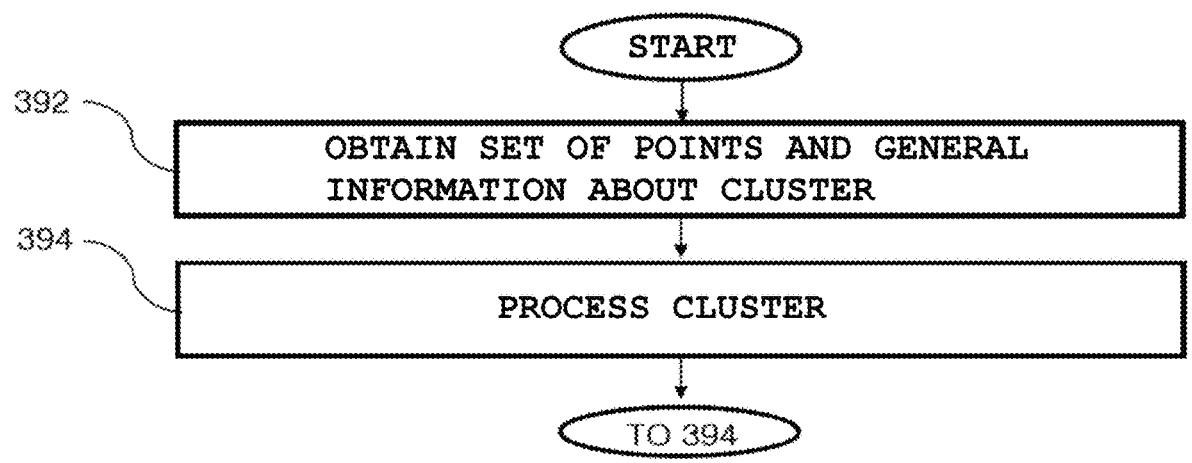
FIG. 22 is a flowchart showing an embodiment of step 238 shown in FIG. 4.

FIG. 22 is a flowchart showing an embodiment 238A of step 238 shown in FIG. 4.

Referring to FIG. 22, a set of points included in the cluster (e.g. the second cluster) may be generated, and general information about the cluster may be obtained (step 392).

Figure 23:
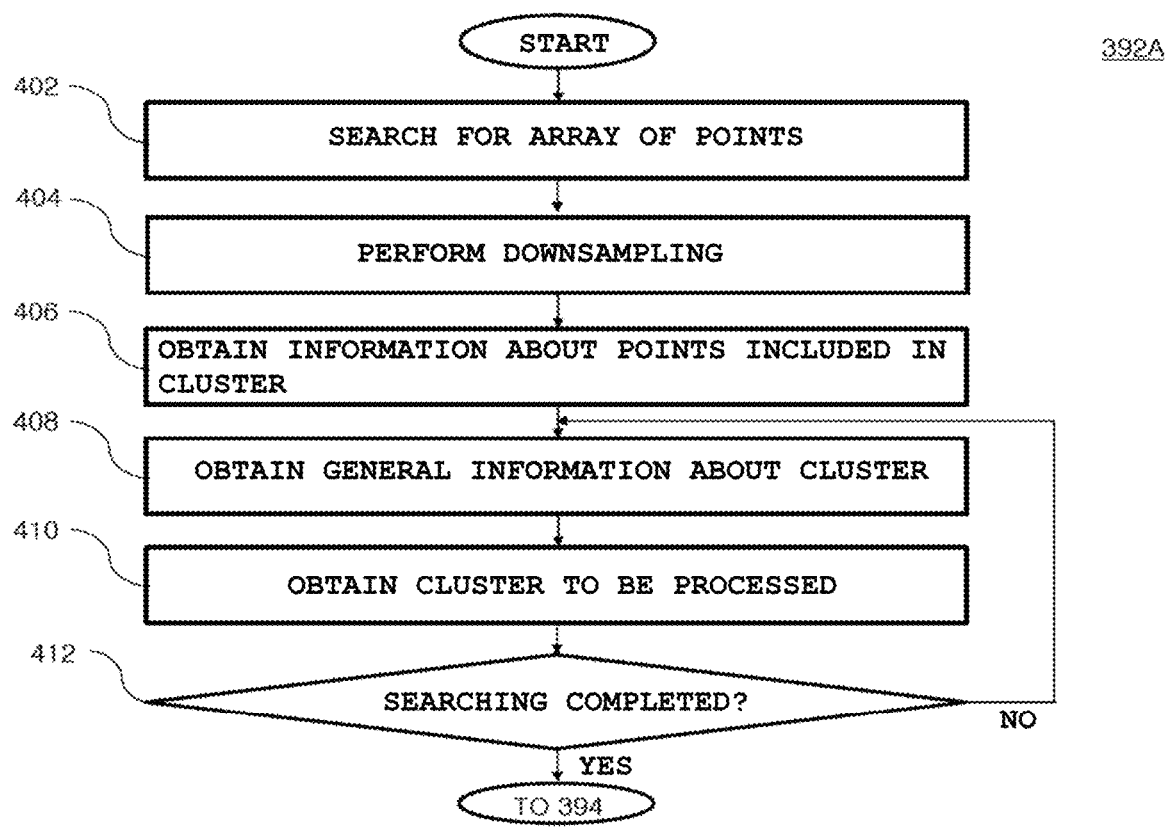
FIG. 23 is a flowchart showing an embodiment of step 392 shown in FIG. 22.

FIG. 23 is a flowchart showing an embodiment 392A of step 392 shown in FIG. 22.

Referring to FIG. 23, an array of points is searched for (step 402).

After step 402, valid points included in the cluster are downsampled (step 404).

Figure 24:
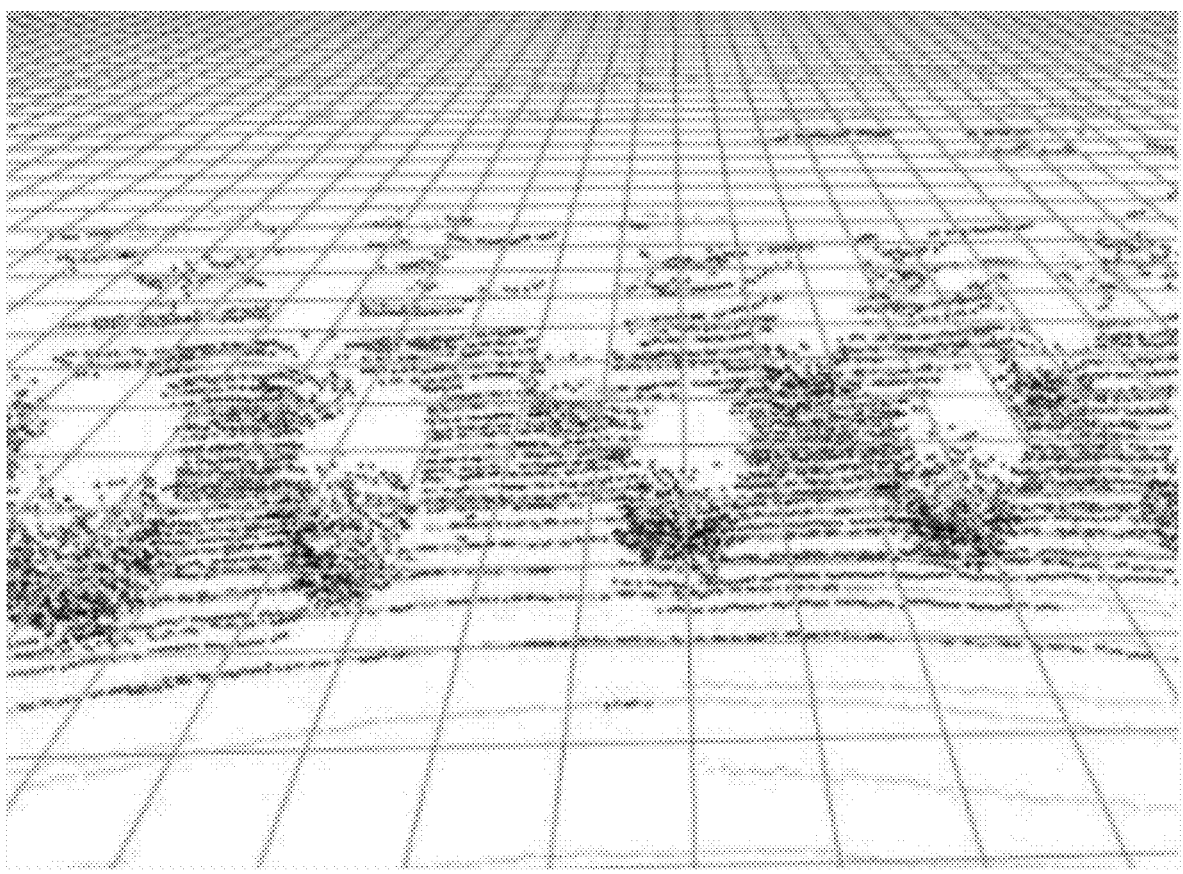
FIG. 24 is a view for explaining downsampling.

FIG. 24 is a view for explaining downsampling.

For example, downsampling may be performed only when the number of valid points included in each cluster obtained as a result of the labeling is greater than or equal to a predetermined number. For example, the predetermined number may be 10,000. The number Nds serving as a reference for downsampling may be obtained as in Equation 1 below.

$$Nds = \frac{Nc}{Np} + 1 \qquad \text{[Equation 1]}$$

Here, Nc represents the number of valid points included in the cluster, and Np represents the predetermined number.

At this time, only valid points satisfying Equation 2 below are used as a set of clusters:

$$(Ip) \bmod (Nds) = 0. \qquad \text{[Equation 2]}$$

In other words, in the case in which Np is 10,000, when the number of valid points included in the cluster before downsampling is 14,000, the downsampled number of valid points included in the cluster is 7,001, and when the number of valid points included in the cluster before downsampling is 27,900, the downsampled number of valid points included in the cluster is 9,300.

Meanwhile, when information about the valid points determined in step 314 shown in FIG. 7 is stored, the stored information about the valid points may be used after step 402 is performed and before step 404 is performed. On the other hand, when information about the valid points determined in step 314 shown in FIG. 7 is deleted rather than being stored, whether the points included in the cluster are valid points may be checked after step 402 is performed and before step 404 is performed. The method of determining points corresponding to valid points may be the same as that described with reference to step 314 shown in FIG. 7, and thus a duplicate description thereof has been omitted.

The number of valid points DSP included in the cluster may be reduced by performing step 404, as shown in FIG. 24.

Referring again to FIG. 23, after step 404, information about the valid points included in the cluster is obtained (step 406).

After step 406, general information about the cluster is obtained by investigating the points included in the cluster (step 408). For example, general information about the cluster may be obtained while investigating the valid points included in each cluster.

In other words, the general information about the cluster may include the maximum value, the minimum value, and the average value of each of the x-axis coordinates, the y-axis coordinates, and the z-axis coordinates of the valid points included in the cluster.

In addition, the general information about the cluster may further include the longitudinal and lateral lengths of the cluster.

In addition, the general information about the cluster may further include, among the valid points included in the cluster, the 3D coordinates of the valid points having the maximum x-axis coordinate and the minimum x-axis coordinate. The general information about the cluster may further include the 3D coordinates of the valid points having the maximum y-axis coordinate and the minimum y-axis coordinate. The general information about the cluster may further include the 3D coordinates of the valid points having the maximum z-axis coordinate and the minimum z-axis coordinate.

In addition, the general information about the cluster may include the maximum value and the minimum value of the layers of the valid points for each of the plurality of LiDAR sensors.

Referring again to FIG. 22, after step 392, the cluster may be processed (step 394). A cluster to be processed, which is required in order to perform step 394, may be obtained in step 392. In other words, referring to FIG. 23, after step 408, a cluster to be processed is obtained from among the clusters (step 410).

In one example, among the clusters obtained by performing step 237, a cluster that is highly likely to be a vehicle or a rear bumper of a vehicle may be selected as a cluster to be processed. For example, when each of the longitudinal length and the lateral length of the cluster is within a predetermined range, when the minimum value and the maximum value of the x-axis coordinate of the cluster are within a predetermined range, and when the minimum value and the maximum value of the y-axis coordinate of the cluster are within a predetermined range, a cluster that satisfies the above conditions may be selected as a cluster to be processed.

When a cluster to be processed is selected, the index of the selected cluster to be processed may be stored. The cluster to be processed may be subject to merging when merging the clusters.

After step 410, whether all of the clusters have been completely searched for, in other words, whether steps 408 and 410 have been performed on all of the clusters, may be checked (step 412). When not all of the clusters have been completely searched for (NO in step 412), the process proceeds to step 408, and steps 408 and 410 are performed on the clusters that have not been searched for.

On the other hand, when all of the clusters have been completely searched for (YES in step 412), the process proceeds to step 394.

Figure 25:
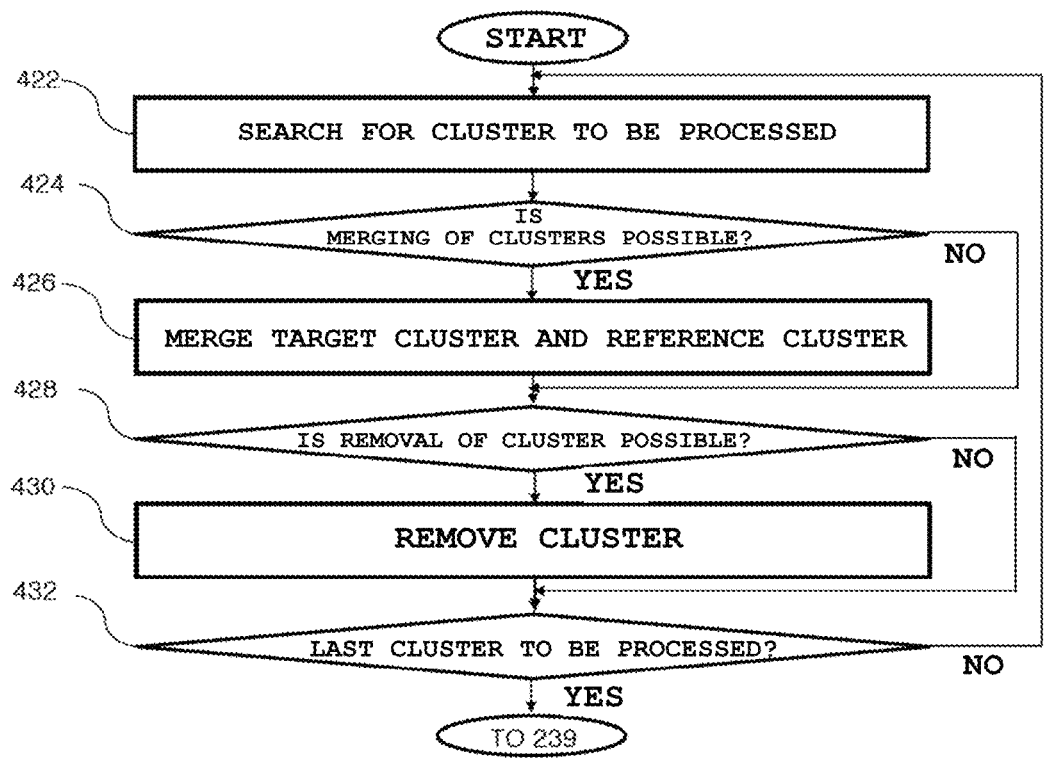
FIG. 25 is a flowchart showing an embodiment of step 394 shown in FIG. 22.

FIG. 25 is a flowchart showing an embodiment 394A of step 394 shown in FIG. 22.

Step 394A shown in FIG. 25 may be performed on a target cluster selected in step 392A. Accordingly, clusters to be processed are searched for and selected (step 422).

Hereinafter, among the clusters to be processed, a cluster serving as a reference for merging is referred to as a "reference cluster", and a cluster to be merged is referred to as a "target cluster".

After step 422, whether it is possible to merge the reference cluster and the target cluster is checked (step 424). When it is possible to merge the reference cluster and the target cluster, the target cluster and the reference cluster are merged (step 426).

Figure 26A:
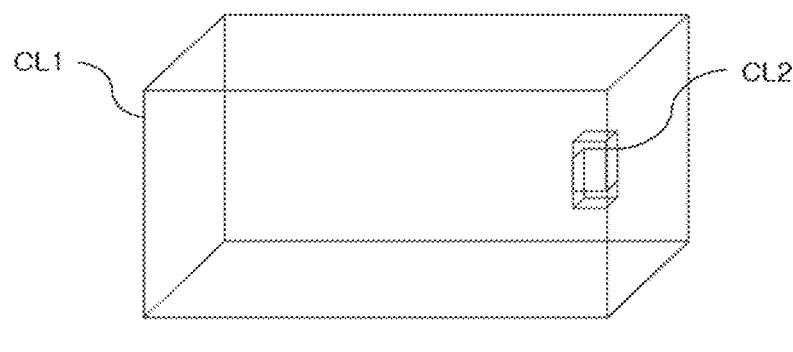
FIGS. 26A and 26B are views for explaining steps 424 and 426 shown in FIG. 25.
Figure 26B:
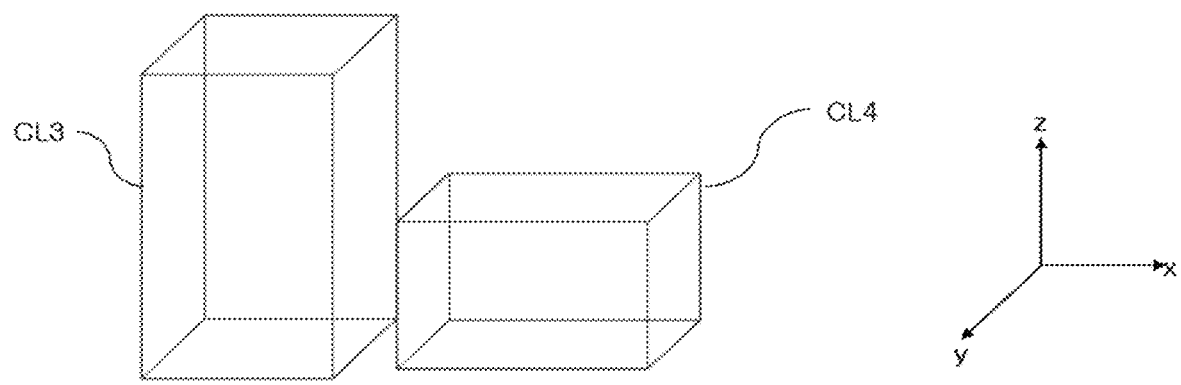

FIGS. 26A and 26B are views for explaining steps 424 and 426 shown in FIG. 25.

According to an embodiment, whether the target cluster is included in the reference cluster may be checked (step 424). When the target cluster is included in the reference cluster (YES in step 424), the reference cluster and the target cluster are merged in a manner of incorporating the target cluster into the reference cluster (step 426).

Referring to FIG. 26A, the minimum value (min) and the maximum value (max) of the layer of the valid point included in the reference cluster CL1 are compared with the minimum value (min) and the maximum value (max) of the layer of the valid point included in the target cluster CL2. When the minimum value (min) and the maximum value (max) of the layer of the valid point included in the target cluster CL2 are within the minimum value (min) and the maximum value (max) (or a value larger than the maximum value) of the layer of the valid point included in the reference cluster CL1, the target cluster CL2 may be merged with the reference cluster CL1. In other words, the target cluster CL2, which is relatively small, may be incorporated in the reference cluster CL1, which is relatively large.

According to another embodiment, the target cluster and the reference cluster may be merged using the widths of the reference cluster and the target cluster in the lateral direction (i.e. the y-axis direction) and the spacing distance between the reference cluster and the target cluster in the longitudinal direction (i.e. the x-axis direction) (steps 424 and 426).

Referring to FIG. 26B, when the widths of a reference cluster CL3 (or CL4) and a target cluster CL4 (or CL3) in the lateral direction have constant values and when the spacing distance between the reference cluster CL3 (or CL4) and the target cluster CL4 (or CL3) in the longitudinal direction is less than a threshold spacing distance, the reference cluster CL3 (or CL4) and the target cluster CL4 (or CL3) may be merged. For example, the reference cluster CL3 may correspond to a front portion of a box truck, and the target cluster CL4 may correspond to a rear portion of the box truck. In this case, because the reference cluster CL3 and the target cluster CL4 are clusters associated with a single box truck, the reference cluster CL3 and the target cluster CL4 may be merged according to the embodiment.

The threshold value used to perform step 424, for example, the threshold spacing distance, may be determined with reference to an ROI-based two-dimensional look-up table (LUT). In addition, the threshold value may be accumulated and tuned based on traveling data (logging data), with priority given to prevention of incorrect operation (i.e. from the perspective of false-negative).

Figure 27A:
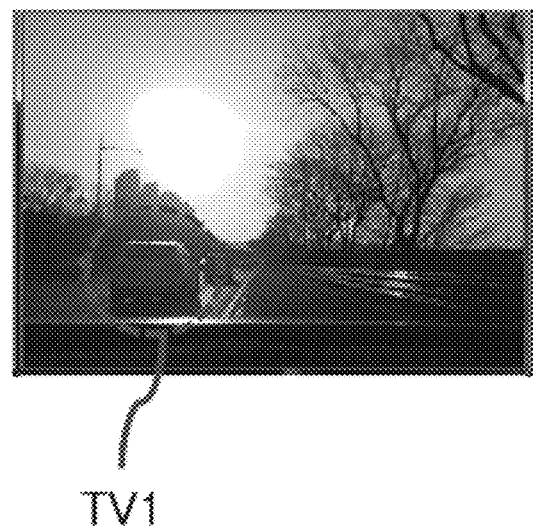
FIGS. 27A, 27B, and 27C show an example for explaining steps 424 and 426.
Figure 27B:
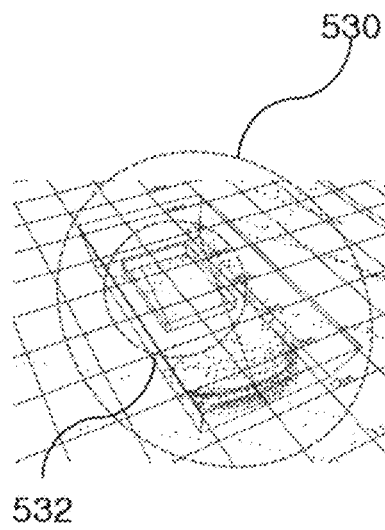
Figure 27C:
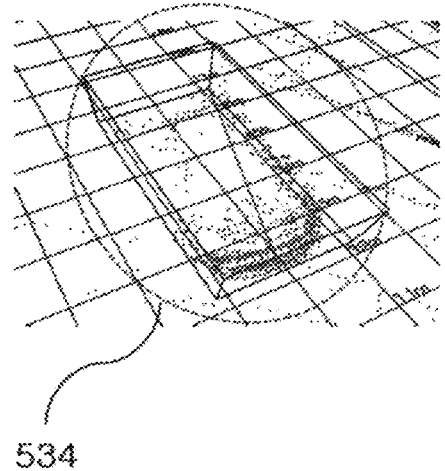

FIGS. 27A, 27B, and 27C show an example for explaining steps 424 and 426. Specifically, FIG. 27B shows clusters 532 and 530 associated with the other vehicle TV1 shown in FIG. 27A, and FIG. 27C shows the result 534 of merging the clusters 530 and 532 shown in FIG. 27B.

The rear surface and the side surfaces of the vehicle TV1 shown in FIG. 27A appear as one cluster 530, as shown in FIG. 27B, but points radiated on the ceiling of the vehicle TV1 through the rear glass of the vehicle TV1 may appear as a separate cluster 532, as shown in FIG. 27B. In this case, the separate cluster 532 shown in FIG. 27B may be merged with the cluster 530 associated with the rear surface and the side surfaces of the vehicle TV1 by performing steps 424 and 426 according to the embodiment. Accordingly, a merged cluster 534 may be generated, as shown in FIG. 27C.

Figure 28A:
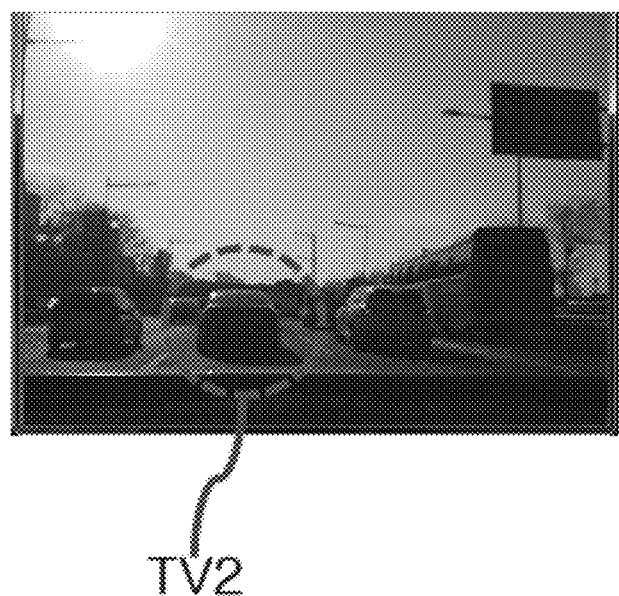
FIGS. 28A, 28B, and 28C show another example for explaining steps 424 and 426.
Figure 28B:
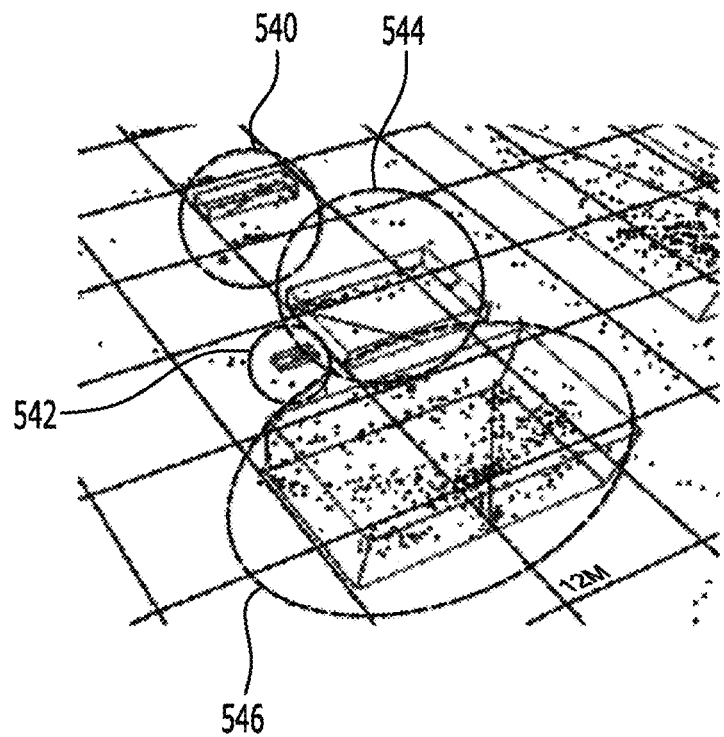
Figure 28C:
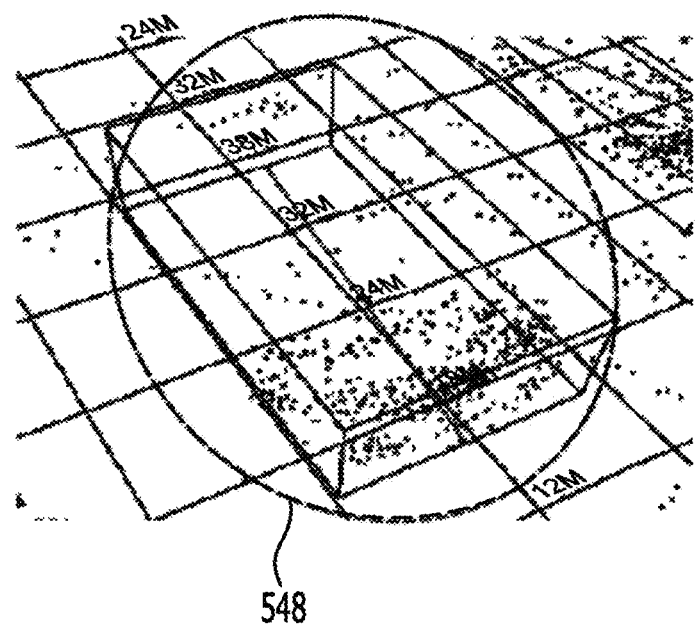

FIGS. 28A, 28B, and 28C show another example for explaining steps 424 and 426. Specifically, FIG. 28B shows clusters 540, 542, 544, and 546 associated with the other vehicle TV2 shown in FIG. 28A, and FIG. 28C shows the result 548 of merging the clusters 540, 542, 544, and 546 shown in FIG. 28B.

Points associated with the rear surface of the vehicle TV2 located directly ahead of the host vehicle, which is shown in FIG. 28A, may normally appear as one cluster 546, as shown in FIG. 28B. However, points radiated on the ceiling and the headrests through the glass of the vehicle TV2 may appear as separate clusters 540, 542, and 544, as shown in FIG. 28B. In this case, the separate clusters 540, 542, and 544 shown in FIG. 28B may be merged with the cluster 546 generated by the points associated with the rear surface of the vehicle TV2 by performing steps 424 and 426 according to the embodiment. Accordingly, a merged cluster 548 may be generated, as shown in FIG. 28C.

Referring again to FIG. 25, when merging of the clusters to be processed is not possible (NO in step 424), whether it is possible to remove the clusters to be processed is checked (step 428). For example, when it is possible to remove the clusters (YES in step 428), the clusters are removed (step 430). In other words, steps 428 and 430 may be performed in order to generate a valid cluster by removing a small cluster that is highly likely to be a false cluster.

For example, it is possible to remove a false cluster or a cluster corresponding to noise from among the clusters using at least one of the number of LiDAR sensors 110 acquiring the point clouds, the positions of the LiDAR sensors 110, or the sizes of the clusters (step 430).

Figure 29A:
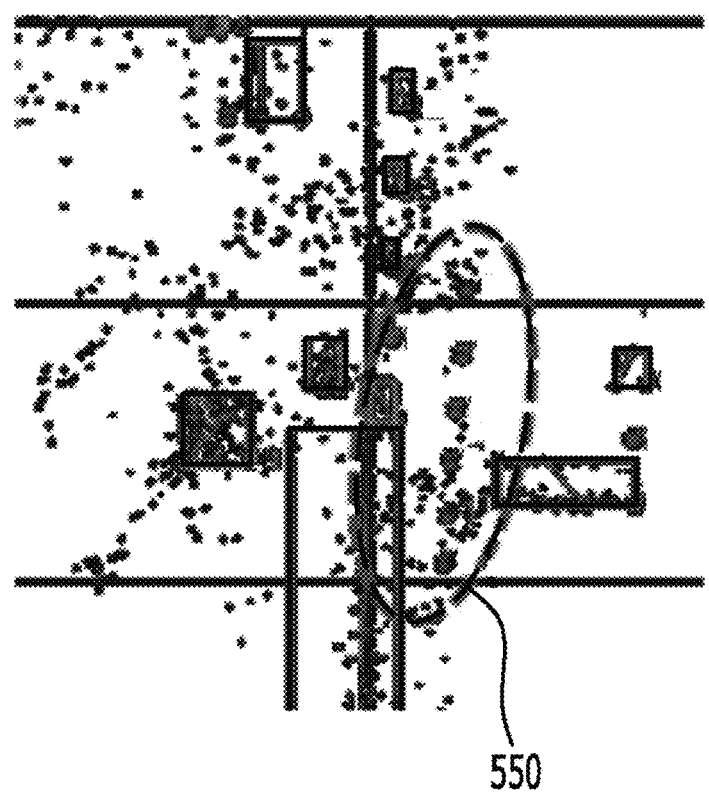
FIGS. 29A and 29B are views to help understand steps 428 and 430.
Figure 29B:
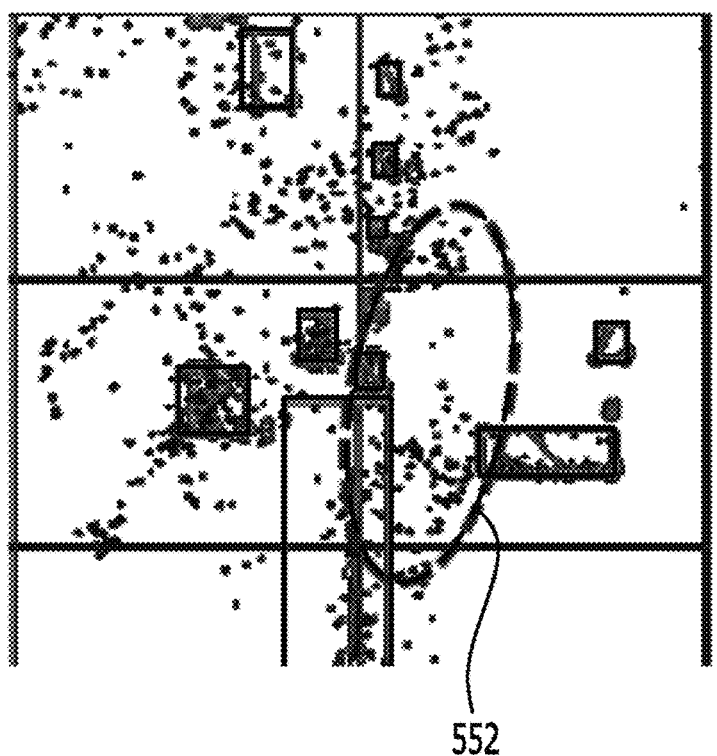

FIGS. 29A and 29B are views to help understand steps 428 and 430.

The cluster 550 shown in FIG. 29A, which has a small size, is highly likely to be a false cluster. Accordingly, the cluster 550 may be removed by performing steps 428 and 430, as indicated by reference numeral 552 in FIG. 29B.

Figure 30A:
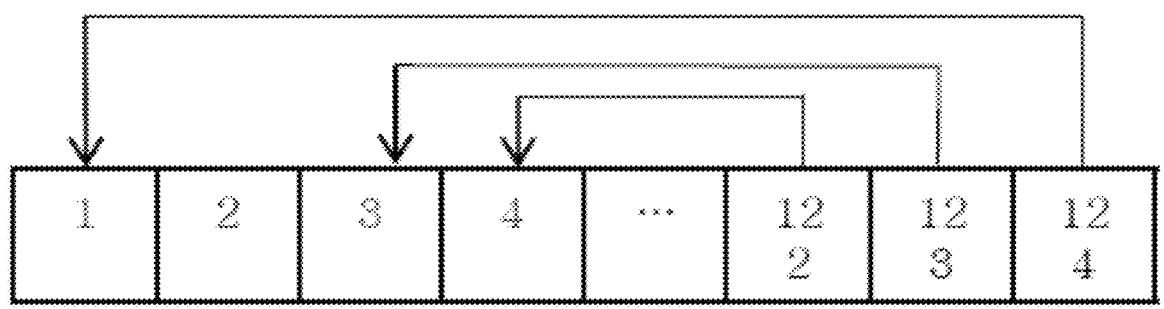
FIGS. 30A and 30B are views showing a memory in which the IDs of clusters are stored.
Figure 30B:
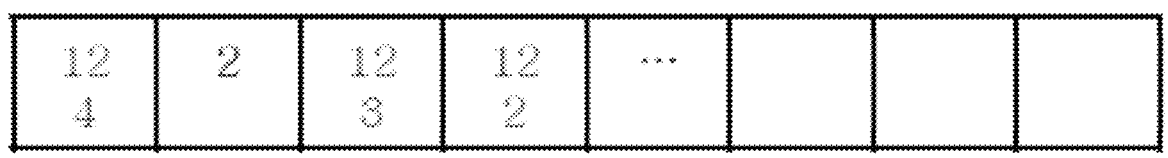

FIGS. 30A and 30B are views showing a memory in which the IDs of the clusters are stored.

The IDs of the clusters generated by performing step 237 may be stored in the memory, as shown in FIG. 30A. At this time, in the case in which small clusters are removed by performing steps 428 and 430, the cluster, the ID stored in the last segment of the memory, among the IDs of the remaining clusters, may move first to the position of the ID of the removed cluster.

For example, when the clusters having IDs of 1, 3, and 4 are removed by performing steps 428 and 430 as shown in FIG. 30A, an ID of 124, which is stored in the last segment of the memory, may move to the position of an ID of 1, an ID of 123 may move to the position of an ID of 3, and tan ID of 122 may move to the position of an ID of 4 as shown in FIG. 30A. Therefore, it is possible to efficiently manage the memory storing the IDs of the cluster.

Although it is illustrated in FIG. 25 that steps 428 and 430 are performed after steps 424 and 426 are performed, the embodiments are not limited thereto. In other words, according to another embodiment, steps 424 and 426 may be performed after steps 428 and 430 are performed.

After step 430, whether the cluster merging and removal step has been performed on the last cluster to be processed is checked (step 432). In other words, whether steps 424 to 430 have been performed on all of the clusters to be processed is checked. When steps 424 to 430 have not been performed on all of the clusters to be processed (NO in step 432), the process proceeds to step 422 to select a cluster to be processed that has not been searched for, and subsequently, steps 424 to 430 described above are performed.

Meanwhile, referring again to FIG. 4, after step 238 is performed, whether steps 233 to 238 have been performed on all of the steps is checked (step 239). The reason for this is that steps 233 to 238 are performed on each step. When steps 233 to 238 have not been performed on all of the steps (NO in step 239), the process proceeds to step 233, so steps 233 to 238 may be performed on another step.

In addition, a computer-readable recording medium in which a program for executing the object-tracking method according to the embodiment is recorded may store a program for implementing a function of acquiring a point cloud using a LiDAR sensor and a function of clustering the point cloud. The function of clustering includes a function of generating a 3D grid map using the point cloud acquired by the LiDAR sensor. The program may also implement a function of labeling voxels present in the 3D grid map with one cluster using direction points of the voxels and checking whether it is necessary to label the voxels with mutually different clusters.

The computer-readable recording medium includes all kinds of recording devices in which data capable of being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium can also be distributed over network-connected computer systems so that the computer-readable code is stored and executed in a distributed fashion. Also, functional programs, code, and code segments for accomplishing the method of tracking an object using a LiDAR sensor can be easily devised by those having ordinary skill in the art to which the present disclosure pertains.

The object-tracking method and apparatus according to the embodiments described above may cluster, to the greatest possible extent, points generated in association with an object to be recognized. In addition, each cluster is processed through post-processing, and thus effectiveness and utilization of the cluster may be improved. In addition, the computation time taken for clustering according to the embodiment may be reduced.

As is apparent from the above description, the apparatus and the method for tracking an object using a LiDAR sensor and the recording medium storing a program to execute the method according to the embodiments are capable of clustering, to the greatest possible extent, points generated in association with an object to be recognized, of improving effectiveness and utilization of the cluster by performing post-processing on the cluster, and of reducing the computation time.

However, the effects achievable through the embodiments are not limited to the above-mentioned effects. Other effects not mentioned herein should be clearly understood by those having ordinary skill in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to embodiments thereof, these embodiments are only proposed for illustrative purposes, and do not restrict the present disclosure. It should be apparent to those having ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of tracking an object using a LiDAR sensor, the method comprising:
   acquiring a point cloud using each of LiDAR sensors; and
   clustering the point cloud,
   wherein the clustering comprises:
   (a) generating a three-dimensional (3D) grid map using the point cloud acquired by each of the LiDAR sensors; and
   (b) labeling voxels present in the 3D grid map with one cluster using direction points of the voxels and determining whether to label the voxels with mutually different clusters.

2. The method according to claim 1, further comprising:
   performing main start initialization to initialize parameters to be used to perform the method of tracking an object per an operating mode.

3. The method according to claim 2, wherein the performing main start initialization comprises:
   updating tuning parameters per the operating mode;
   updating a constant table based on a tuning value; and
   calculating reference points of the voxels based on the tuning value.

4. The method according to claim 1, wherein the clustering further comprises:
   preprocessing the acquired point cloud.

5. The method according to claim 4, wherein the preprocessing comprises:
   performing tuning start initialization to initialize parameters to be used when clustering the point cloud in scan units; and
   performing step initialization to initialize a result of performing the clustering in step units.

6. The method according to claim 5, wherein the performing step initialization comprises:
   selectively removing results of computation performed in a previous step in relation to the voxels of the 3D grid map; and
   selectively removing results of computation performed in the previous step in relation to clusters.

7. The method according to claim 3, wherein step (a) comprises:
   checking whether respective points included in the point cloud are valid points required to generate the 3D grid map;
   updating a layer range of the valid points included in a unit voxel;
   updating a number of the valid points included in the unit voxel, a number of interpolation points, and identification numbers;
   obtaining the direction points from among the valid points using the reference points; and
   excluding an unusable voxel that is not to be utilized for clustering from among voxels obtained as a result of checking all of the points of the point cloud.

8. The method according to claim 7, wherein, among the points included in the point cloud, points that are object points or interpolation points and have coordinates within a threshold of a first region of interest (ROI) are determined to be the valid points.

9. The method according to claim 7, wherein, among the valid points, points closest to the reference points, corresponding to vertices of the unit voxel, are obtained as the direction points.

10. The method according to claim 7, wherein the excluding an unusable voxel comprises:
    checking whether a voxel does not belong to a first ROI;
    checking the number of the valid points included in the voxel;
    checking intensities of the valid points included in the voxel;
    checking a number of layers in which the voxel is formed; and
    determining the unusable voxel and a usable voxel according to at least one of results of the checking.

11. The method according to claim 1, wherein step (b) comprises:
    (b1) checking whether respective voxels included in the 3D grid map are valid voxels;
    (b2) performing a primary labeling to assign a same identification number to voxels that are estimated to be associated with a same object among the valid voxels; and
    (b3) performing a secondary labeling in which mutually different identification numbers are assigned by checking the voxels to which the same identification number has been assigned through the primary labeling.

12. The method according to claim 11, wherein, in step (b1), a voxel having no point of the point cloud, a voxel on which the primary labeling or the secondary labeling has been performed, or a voxel having only interpolation points is determined to be an invalid voxel.

13. The method according to claim 11, wherein step (b2) comprises:
    (b21) obtaining a corresponding direction point of a corresponding voxel that is subject to labeling and a comparison direction point of a comparison voxel that is compared with the corresponding voxel and located near the corresponding voxel from among the valid voxels;
    (b22) checking whether a distance difference between the comparison direction point and the corresponding direction point is less than a size of the corresponding voxel;

(b23) checking whether at least one of the comparison direction point or the corresponding direction point is present within a second ROI;

(b24) checking whether a spacing distance between the comparison direction point and the corresponding direction point is less than or equal to a predetermined threshold distance; and (b25) assigning the same identification number to the comparison voxel and the corresponding voxel when all of step (b22), step (b23), and step (b24) are satisfied.

14. The method according to claim 11, wherein, in step (b3), when the voxels to which the same identification number has been assigned through the primary labeling are voxels generated in association with a boundary of a road, the mutually different identification numbers are assigned to the voxels.

15. The method according to claim 11, wherein, in step (b3), a minimum value and a maximum value of an x-axis coordinate and a minimum value of a y-axis coordinate of each of the voxels to which the same identification number has been assigned through the primary labeling and signs of a maximum value and a minimum value of a y-axis coordinate of a center point of each of the voxels are used in order to determine whether to assign the mutually different identification numbers to the voxels.

16. The method according to claim 1, wherein the clustering further comprises:

(c) generating a set of points included in clusters and obtaining general information about the clusters.

17. The method according to claim 16, wherein step (c) comprises:

downsampling valid points included in the clusters;

obtaining information about points included in the clusters; and searching for points included in the clusters to obtain the general information about the clusters, and wherein the clustering further comprises:

(d) processing the clusters.

18. The method according to claim 17, wherein step (c) further comprises:

obtaining clusters to be processed from among the clusters, and wherein step (d) comprises at least one of:

when a target cluster that is subject to merging, among the clusters to be processed, is included in a reference cluster serving as a reference for merging, incorporating the target cluster into the reference cluster;

merging the target cluster and the reference cluster using widths of the reference cluster and the target cluster in a lateral direction and a spacing distance between the reference cluster and the target cluster in a longitudinal direction; or removing a false cluster or a cluster corresponding to noise from among the clusters using at least one of a number of the LiDAR sensors acquiring the point cloud, positions of the LiDAR sensors, or sizes of the clusters.

19. An apparatus for tracking an object using a LiDAR sensor, the apparatus comprising:

a LiDAR sensor configured to acquire a point cloud; and a clustering unit configured to cluster the point cloud, wherein the clustering unit comprises:

a grid map generator configured to generate a 3D grid map using the point cloud acquired by the LiDAR sensor; and a labeling unit configured to label voxels present in the 3D grid map with one cluster using direction points of the voxels and to determine whether to label the voxels with mutually different clusters.

20. A non-transitory computer-readable recording medium in which a program for executing a method of tracking an object using a LiDAR sensor is recorded, the program to direct a processor to perform acts of:

acquiring a point cloud using a LiDAR sensor; and clustering the point cloud, wherein the clustering comprises:

generating a 3D grid map using the point cloud acquired by the LiDAR sensor; and labeling voxels present in the 3D grid map with one cluster using direction points of the voxels and determining whether to label the voxels with mutually different clusters.

* * * * *